(12) United States Patent
Carlton et al.

(10) Patent No.: US 7,877,494 B2
(45) Date of Patent: Jan. 25, 2011

(54) METHOD, COMPONENTS AND SYSTEM FOR TRACKING AND CONTROLLING END USER PRIVACY

(75) Inventors: Alan G. Carlton, Mineola, NY (US);
Alan Charles Louis Briacon, Poolesville, MD (US); Narayan P. Menon, Syosset, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 266 days.

(21) Appl. No.: 11/749,769

(22) Filed: May 17, 2007

(65) Prior Publication Data
US 2007/0271379 A1 Nov. 22, 2007

Related U.S. Application Data

(60) Provisional application No. 60/801,153, filed on May 17, 2006.

(51) Int. Cl.
*G06F 15/16* (2006.01)
(52) U.S. Cl. .................................. 709/229; 709/228
(58) Field of Classification Search ............... 709/228, 709/229
See application file for complete search history.

(56) References Cited

U.S. PATENT DOCUMENTS 6,636,491 B1 * 10/2003 Kari et al. .................. 370/328

OTHER PUBLICATIONS

Alan Cooper, *The Inmates Are Running The Asylum—Why High-Tech Products Drive Us Crazy And How To Restore The Sanity*, Sams Publishing, (Indianapolis, Mar. 2004).

International Telecommunication Union, "Method For The Characterization Of Telecommunication Services Supported By An ISDN And Network Capabilities Of An ISDN", Integrated Services Digital Network (ISDN) General Structure, ITU-T Recommendation I.130, (1993).

Kocher et al., "Security As A New Dimension in Embedded System Design", NEC Laboratories America, Princeton, pp. 753-760, (San Diego, Jun. 7-11, 2004).

Ravi et al., "Securing Wireless Data: System Architecture Challenges", Computer & Communications Research Labs NEC USA, Princeton, pp. 195-200, (Kyoto, Japan Oct. 2-4, 2002).

Wireless World Research Forum, "The Book Of Vision 2001, Visions Of The Wireless World", Version 1.0, (Dec. 2001).

* cited by examiner

*Primary Examiner*—Vivek Srivastava
*Assistant Examiner*—Adnan Mirza
(74) *Attorney, Agent, or Firm*—Volpe and Koenig, P.C.

(57) ABSTRACT

A privacy service is provided for use in protection of user data transferred in a network, including a converged network. The privacy service extracts and measures service elements of a message containing user data. The service elements include an identity element, a trust element, a rights element and a security element. The privacy service performs security by comparing service elements with a user defined privacy policy. The privacy policy may also be based on particular factors relating to the application, context, and time of the message. In another embodiment, the privacy service provides controls that indicate when user data is misappropriated as a result of an infringement of the user defined privacy policy. Further the privacy service provides a means to audit and trace deviations from the privacy policy for the purpose of repudiation, or future defense of security threats.

34 Claims, 15 Drawing Sheets

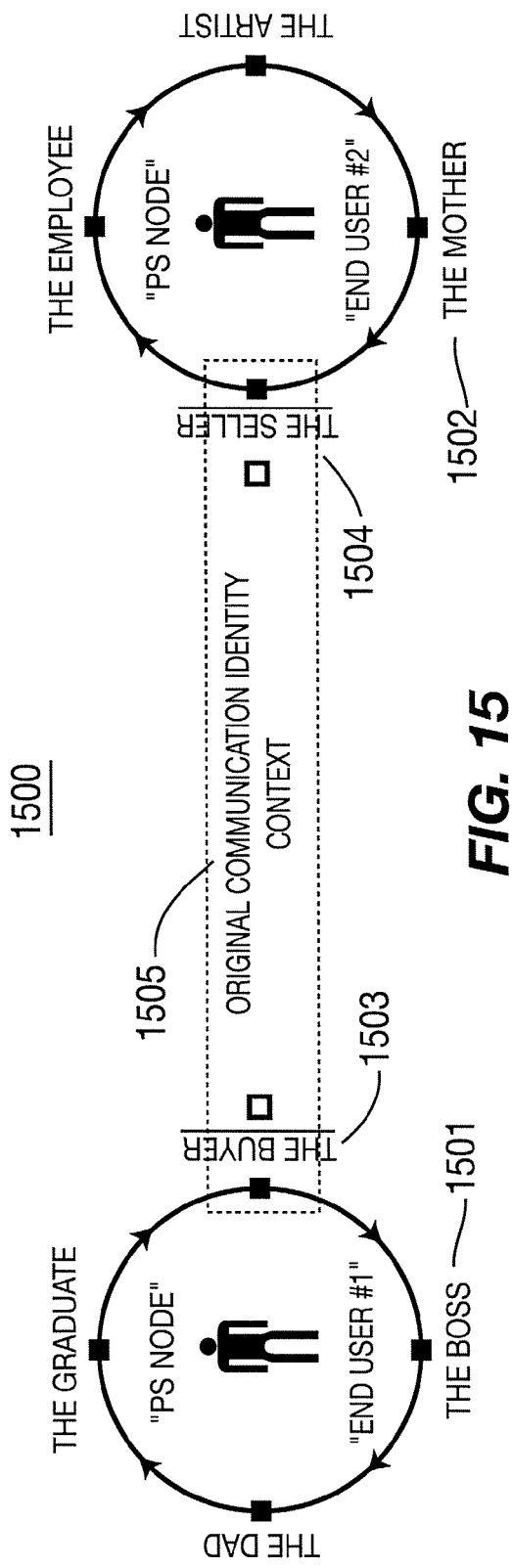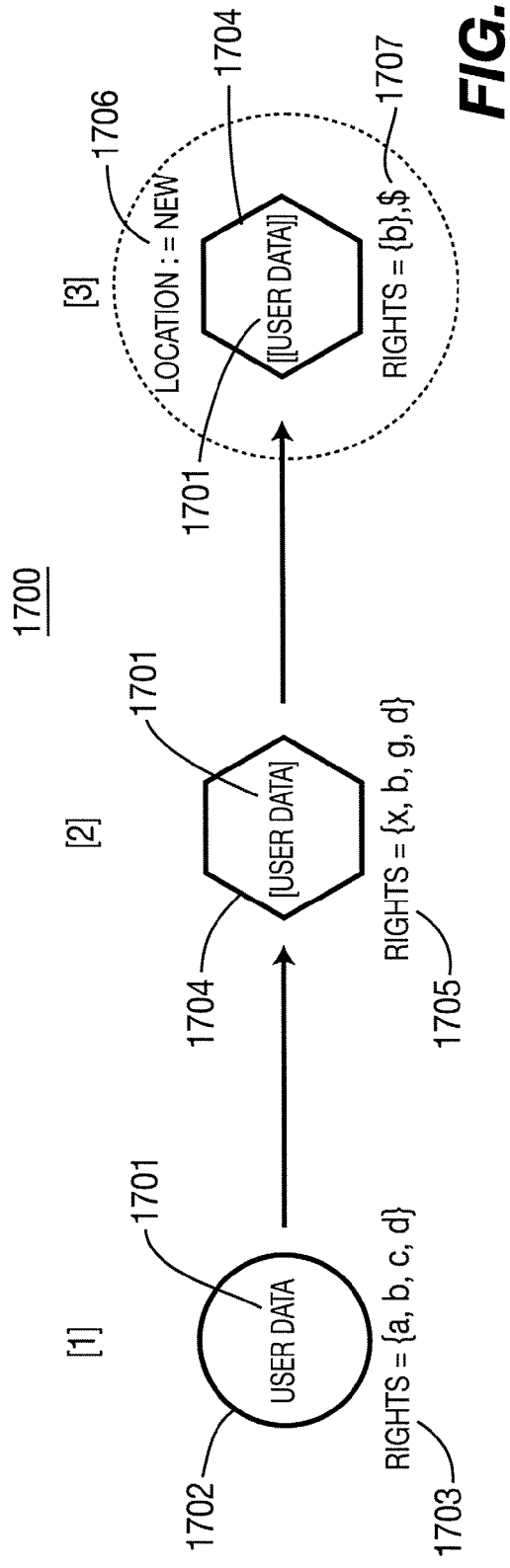

METHOD, COMPONENTS AND SYSTEM FOR TRACKING AND CONTROLLING END USER PRIVACY

CROSS REFERENCE TO RELATED APPLICATION

This application claims the benefit of U.S. Provisional Application No. 60/801,153. filed on May 17, 2006, which is incorporated by reference as if fully set forth.

FIELD OF INVENTION

The present invention relates wireless communication systems, in particular to dynamic privacy service (PS), particularly for use in converged wireless networks.

BACKGROUND

The following Acronyms and Abbreviations are used in this document.

AIC Associated Identity Control
ARC Associated Rights Control
AS Associated Service
ASC Associated Security Control
ATC Associated Trust Control
CPU Central Processing Unit
DES Data Encryption Standard
EU End User
FFS For Further Study
GSM Global System for Mobility
GPRS General Packet Radio Service
IC Instantaneous Communications
IEEE Institute of Electrical and Electronic Engineers
IIc Independent Identity Control
IP Internet Protocol
IRC Independent Rights Control
IrDA Infrared Data Association
IS Independent Service
ISC Independent Security Control
ITC Independent Trust Control
LAN Local Area Network (see definitions)
MIPS Million Instructions Per Second
OSI Open Systems Interconnection
PAN Personal Area Network
PS Privacy Service
RFID Radio Frequency Identification
RSA Rivest, Shamir, Adleman
R Receive or Sink
RD Receive Deviation
RP Receive Policy
S Send or Source
SD Send Deviation (from Policy)
SP Send Policy
SSL Secure Sockets Layer
UNITRIPS Unified Trust, Rights, Identity, Privacy and Security
UDB User Database
UWB Ultra Wideband
WAN Wide Area Network
WEP Wired Equivalent Privacy
WS Web Services
WTRU Wireless Transmit/Receive Unit In general, privacy is an end user state, such as a state of being secluded from the presence of, or view of others, a state of being free from unsanctioned intrusion, or a state of being concealed. There may be different states instantaneously for any or all of the attributes that define an end user state of privacy. These states and their importance may change based on application, context and time per an explicit or implicit policy. For example, to a shy teenager their first object of secret affection may carry the highest of privacy concern—however to the same adult, it is nothing more than a cute snippet of low privacy merit.

A quantifiable privacy experienced by an end user is reflected in a delta between a policy state (i.e. "what is desired") and an observed state (i.e. "what actually happens").

In newer communications landscape that are emerging, the term converged network is often used to describe the steady evolution/revolution that is taking place in the world of communications. Wireless networks are becoming increasingly diverse. Current systems provide limited, single function devices that are closely tied to single networks. Emerging systems will utilize flexible, powerful devices with transparent access across multiple heterogeneous networks.

FIG. 1 shows an exemplary logical model of a converged network having four principle technology layers: personal area network (PAN), local area network (LAN), wide area network (WAN) and Cyberworld. The model places an end user at the center of a progression of logical concentric spheres or layers. Each level is defined by a plurality of technologies & standards, and a plurality of network and device nodes enabled with these technologies. Communications occur via device and network nodes in one or more layers.

Such a converged network provides new opportunities to deliver new, or enhanced, services to end users. The inventors have recognized that such services may include: broadband on the go and, info-fuelling: intelligent information transfer using best available network, health and wellness via sensor networks, and integrated location services so that the end user will experience a true sense of always being connected, always being "plugged in".

The inventors have further recognized a number of challenges that lie in the path of the converged network vision. Examples of these challenges include: How do you provide access to multiple heterogeneous networks in a manner that is transparent to the user? How will users interact with their devices in order to support and simplify interaction with multiple networks? How do you provide manageability across multiple stakeholders? How do you provide battery life sufficient to support extended use of advanced transport technologies? In particular the inventors have recognized the need to define and address problems created by the converged network in the area of privacy and security. The following observations have been made by the inventors.

End User Implications of the Emerging Environment

An end user's experience in a converged network may be described as continuous. With the increasing ubiquity and diversity of available communication schema, an end user will typically be always connected to a converged network. Thus, it will be possible for user data flows to occur continuously with near minimal impedance. The end user relationship with the converged network will also become increasingly intimate with context-aware technologies (e.g. location, presence, behavior) supporting an increasingly human-like interaction between the end user and the communication environment.

Virtually any digital information or content (or plurality thereof) that may be created or consumed by an end user or on behalf of an end user can be communicated as user data via a node in a converged network. User data may be created or consumed voluntarily or involuntarily. Further, user data may be stored in, or propagated by, the nodes in the converged network.

Typical examples of user data are shown in FIG. 2 that include: medical content, financial information, location, presence, personal content, commercial content, environment information and behaviors. User data will be the fuel of the converged network. A continuously flowing exchange of user data will drive ever-increasing value added service offerings and relationships. In the emerging environment of a converging network, the line between the end user and the user data will become increasingly difficult to determine as end users become ever more intimately associated with a catalog of behaviors and actions in the digital world. In the converged network it might be said that the end user is the user data.

The inventors have recognized that the need to maintain a continuous connection with the converged network has significant implications on end user privacy and security. In current non-converged networks where the average end user is connected for only a small period of the time and PAN/LAN interactions are limited, the problems of spam, pop-ups, virus-attacks, incessant advertising and a general feeling of digital vulnerability are all too familiar. In the converged network the end user will be connected continuously and on-going interactions at the PAN, LAN and WAN levels will be commonplace. This coupled with the inexorable shift to all digital media (for user data) will leave end user's exposed to a massive escalation of privacy and security problems.

The inventors have recognized privacy and security problems that can be characterized in three metaphors: "information overload", "Big Brother", and the "Kafka Nightmare". In the first case, the end user is overwhelmed with data and content. In the second case, the end user becomes disenchanted with the loss of personal privacy control. The third case refers to a privacy metaphor established by Franz Kafka in his seminal novel, "The Trial", in which an end user is persecuted for a crime that he has no knowledge of. The analogy in the information age relates to the misuse (deliberately or accidentally) of user data resulting in some negative action that the End User only becomes aware of after the fact.

Under "Big Brother", the challenge is to control how User Data is used in the cyberworld. However under the "Kafka nightmare", the challenge is providing the end user with controls when their user data is misused (or abused) in the cyberworld.

The success of the Converged Network may well depend on how well these problems are addressed. The inventors have recognized that current privacy and security technologies are limited in their ability to provide the necessary safeguards and controls for the protection of the User Data in all the diversity of communication schema in a Converged Network. A User Data problem is thus presented as follows.

The User Data problem

FIG. 3 shows a general view of the privacy and security technology gap that is emerging with the development of the converged network. As discussed above, the inventors have recognized that the converged network will deliver an enhanced service experience to the end user at the expense of an increased exposure to threats relating to privacy and security. The converged network will be defined by more human-like characteristics such as context sensitivity. Such an environment will demand a like paradigm shift in the nature of the service provided by its privacy and security technologies. Current technologies will persist, however they will need to be complemented with new techniques, as well as amendments to old methods, in order to guarantee a full acceptance of the converged network by end users. In essence, this defines a user data problem of how to provide relevant methods/controls to protect/safeguard all the diversity of a communication schema in the converged network. The inventors have identified three challenges to meet when addressing this problem: cost, context and control.

Cost

Privacy and security is expensive. In the non-converged network, current methods already place a heavy burden on the processing capabilities of the system elements. For example, the total processing requirements for software implementations of SSL executing on an iPAQ handset (i.e. 2325 MIPS Strong ARM processor) was shown to be around 651.3 MIPS, at a link speed of 10 Mbps. A Palm III-X handset requires 3.4 minutes to perform 512-bit RSA generation, 7-seconds to perform digital signature generation, and can perform (single) DES encryption at only 13 kbps, even if the CPU is completely dedicated to security processing.

The nodes in the converged network will be diverse (e.g. a PDA, a consumer electronic, a passport) and enabled with significantly higher throughput capabilities than are common today. Given the characteristics of the emerging environment already described it may be anticipated that the requirements on privacy and security technologies will increase (e.g. more powerful encryption, stronger authentication, and better data mining). Privacy and security technologies will need to offer more flexible solutions to address all the diversity requirements of the converged network while still satisfying increasingly stringent requirements.

Context

Current privacy and security technologies provide discrete protections/safeguards for user data in the non-converged network. They are discrete insofar as they are either on or off. A link is encrypted (e.g. IPsec) or it is not. A node passes authentication (e.g. WEP) or fails; there is trust (e.g. WS-Trust) or rejection. In current technologies there is little or no modulation of said technology with the context of the communications schema. For example, the trust levels applied to an end user, a node, or an element of user data do not vary based upon the instantaneous variables of the schema. In the converged network communications will be continuous and context sensitive. The applications driving privacy and security technologies will need to be smarter to provide relevant solutions in this environment.

Control

Current technology provides little or no controls (to the end user) regarding the secondary usage of user data after an application in an original context (e.g. a credit card purchase). The end user must defer in large part to "faith" that their digital media will be handled with honesty and integrity. In the non-converged network, where currently the transition to an "all digital media" is in its early stages, problems associated with behaviors like identity theft are increasing. In the all-digital media emerging environment of the converged network, these problems will become increasingly pervasive given the increasing importance of user data as the essential fuel of the system. The privacy and security technologies of the converged network will need to provide adequate controls to the end user to guarantee their acceptance of the emerging environment.

To address these concerns the inventors have recognized that quantitative definitions of privacy and security are required to be of value in terms of a service description. Such formal definition can be derived from the "three metaphors" described above, and the converged network characteristic that an end user is defined by the end user's data. With these perspectives considered, the inventors have recognized a need for privacy to be reduced to a quantitative definition built around user data and the relationships between the end user and a converged network.

SUMMARY

The present invention is related to privacy services (PSs) for use in protection of user data transferred in a converged wireless network. The PS may be incorporated in a user device or may be implemented as a separate component which is configured for communicating with a user device to report and receive user input related to the privacy of user data and related privacy policy.

The PS preferably implements a privacy policy though a plurality of service elements which relate to different aspects of user data. The service elements preferably include some or all of an identity element, a trust element, a rights element and a security element.

The identity element preferably associates an identity or a user/originator/owner with the user data which may preferably include a number of user defined identities as well as an anonymous identity. The identity element may also associate an identity of intended or actual recipients with the user data.

The trust element preferably associates a degree of reliability and or quality to the user data. As with the other elements this attribute may change based on how, where and when the user data is communicated.

The rights element preferably defines a set of rights, such a usage rights, from a list of established or user defined rights. For example, whether data is to be read only, editable, available for a specific time period, or any other type of right or restriction one may wish it associate with user data.

The security element preferably defines access and communication attributes, such as whether the user data is password protected or a level of encryption required for communicating the data to another node.

Preferably, a PS extracts and measures metrics for each type of service element of in connection with the communication of user data from one node to another. The PS performs its function by comparing received service element metrics with a default or user defined privacy policy that adjusts the various service elements in response to the received metrics. A privacy policy is also preferably based on one or more particular factors relating to the communication including the Application, Context, and Time of the communication.

Generally, the purpose of the communication of user data preferably forms the Application which a privacy policy associates with user data. For example, pricing information could be associated for access only in connection with communications having the purpose of a sale of specific goods or services. Medical data may be restricted to medical related applications.

A variety of communication attributes are preferably used to define a Context of the communication. A Context may be any measurable attribute, or combination of attributes, of a user data communication that describes a circumstance of the user data communication that is unique or at least differentiable. Typical examples of Context include but are not limited to: Location, Presence, Behavior, Environment, Proximity to other entities, current roles of the communicating parties, the transport technology in use, the reputation of the third-party, Past history or Knowledge of previous communications, and regulation in effect.

The Time element of a communication may include a range of time when user data may be available or unavailable. This may be different depending upon the service elements. For example, where the metrics indicate the communication of data is of the highest trust value, the privacy policy may permit access irrespective of the time of the communication. On the other hand, where a lower value trust metric is associated with the communication, the data communication may, for example, be permitted only during a specified time period such as user defined business hours.

In one embodiment, the PS provides controls that indicate when user data is misappropriated as a result of an infringement of a user defined privacy policy. Further, the PS preferably provides a means to audit and trace deviations from the privacy policy for the purpose of repudiation, or future defense of security threats.

Preferably, the PS is configured to provide a composite of the following three controls over User Data:
  a) Privacy control that allow End Users to isolate themselves (sometimes referred to as "Cocooning") from any or all of the User Data streams available in accordance with an End-User defined Policy;
  b) Privacy control such that User Data generated remains concealed and free from unsanctioned intrusion in accordance with an End-User defined Policy; and
  c) Privacy control that include identification of any circumstance when User Data is misused or abused either accidentally or deliberately.

Other objects and advantages of the present invention will be apparent to those skilled in the art from the following description and accompanying drawings.

BRIEF DESCRIPTION OF THE DRAWINGS

FIG. 15 is an exemplary diagram of an original identity application violation.

FIG. 17 is an exemplary diagram of the independent rights control service.

DETAILED DESCRIPTION OF THE PREFERRED EMBODIMENTS

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
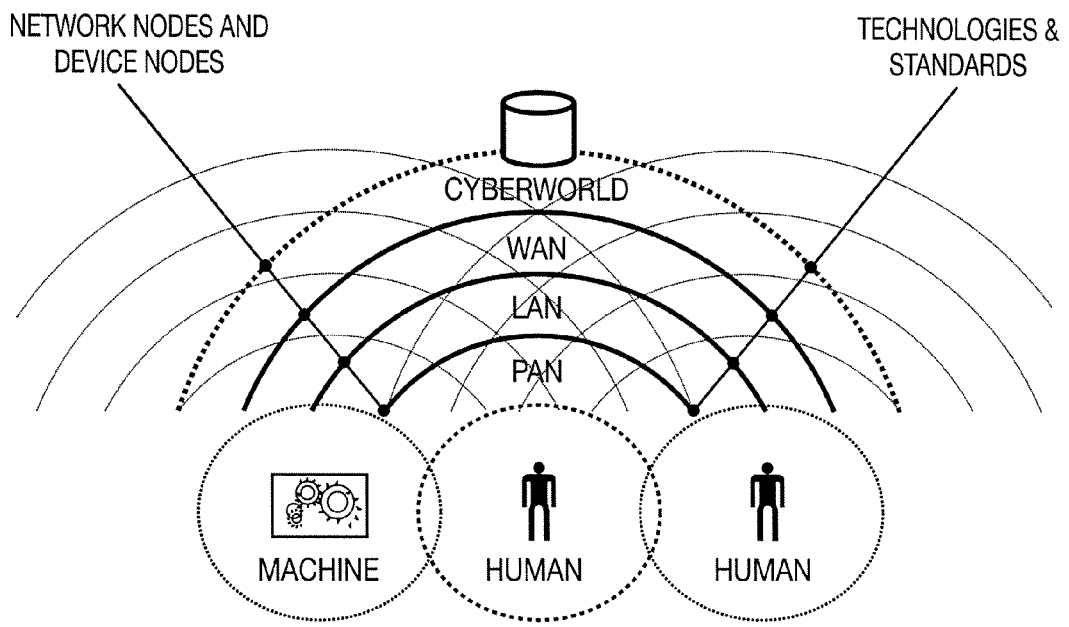
FIG. 1 is a graphic illustration of an exemplary logical model of a converged network.
Figure 2:
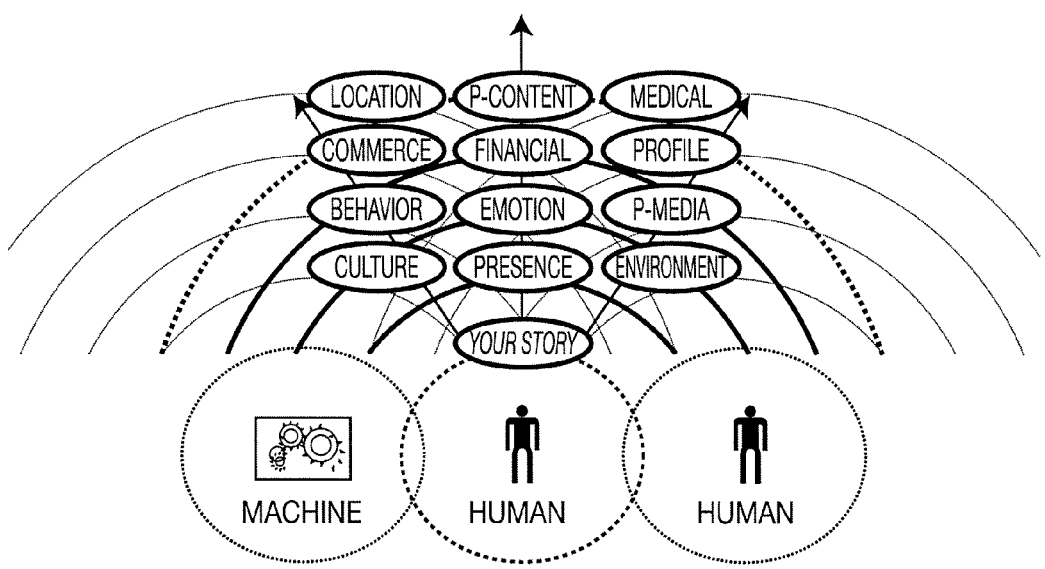
FIG. 2 is a graphic illustration of examples of categories of user data found in a converged network.
Figure 3:
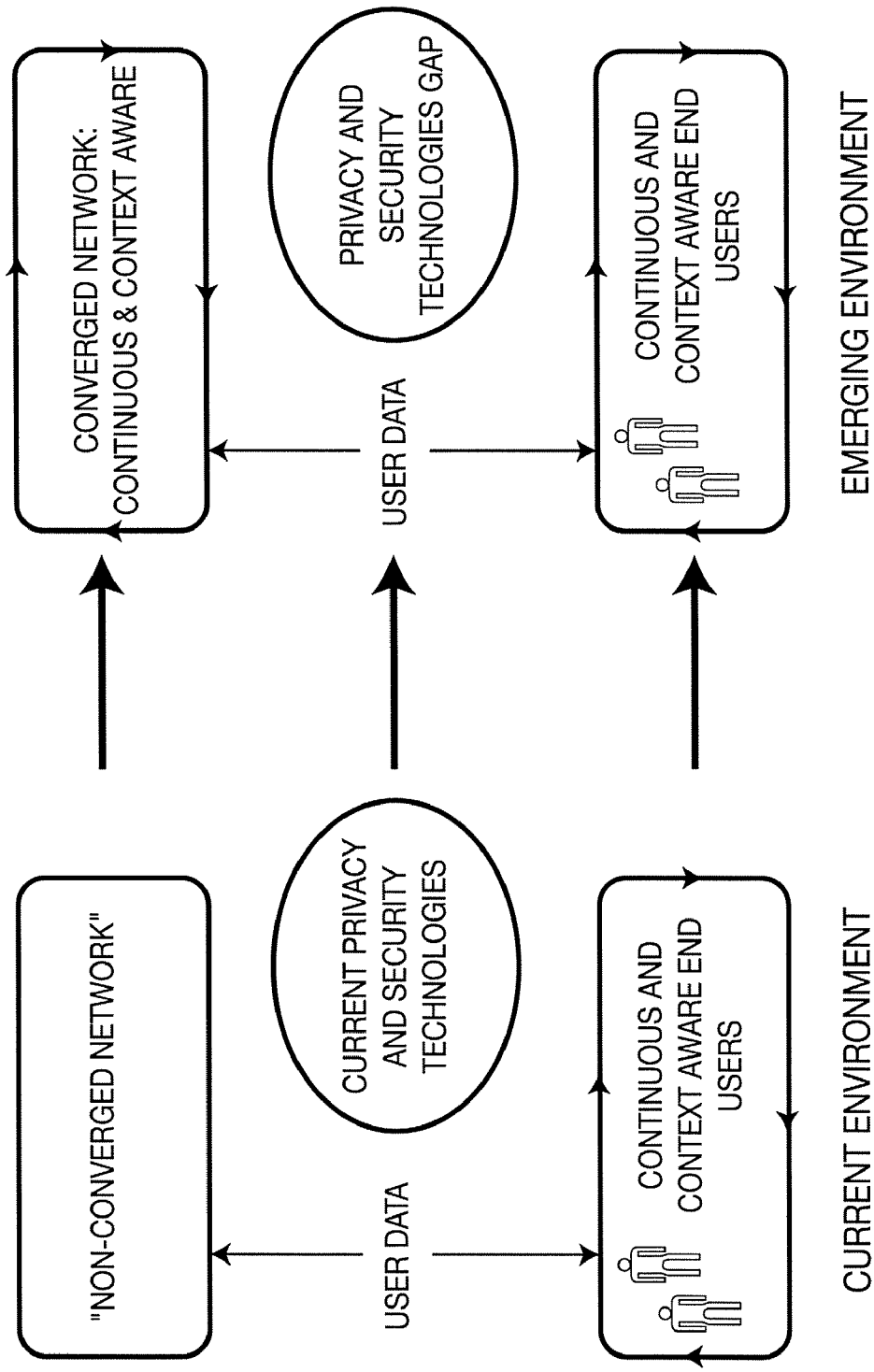
FIG. 3 is a block diagram of a privacy and security technology gap that is emerging as a result of development of a converged network.
Figure 4:
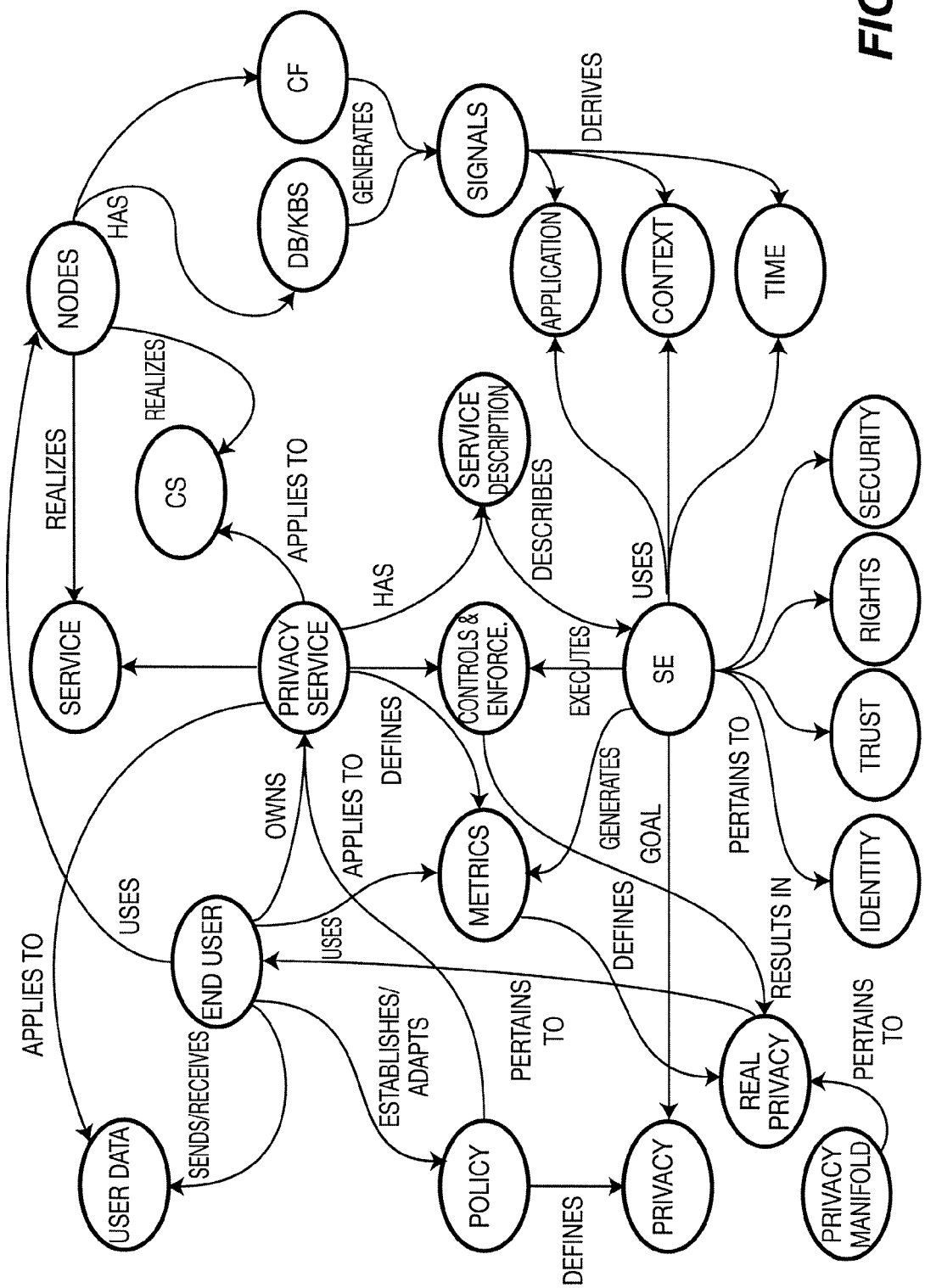
FIG. 4 is an exemplary diagram of a PS service in accordance with the teachings of the present invention.

Referring to FIG. 4, a privacy service (PS) system 400 is illustrated that defines a service solution for the above-referenced user data problem and provides a privacy and security technology solution for a user of a converged network. The PS system 400 provides a PS to protect the User Data generated by an End User. The PS further serves to provide controls to the End User over the User Data that is received. In the PS system 400, User Data is treated as a dynamic entity with associated policies. The PS is preferably configured to serve to enforce policies established or adopted by the End User with due consideration to application, context, and time throughout the user data's lifespan (i.e. from creation to deletion) in the converged network.

Figure 5:
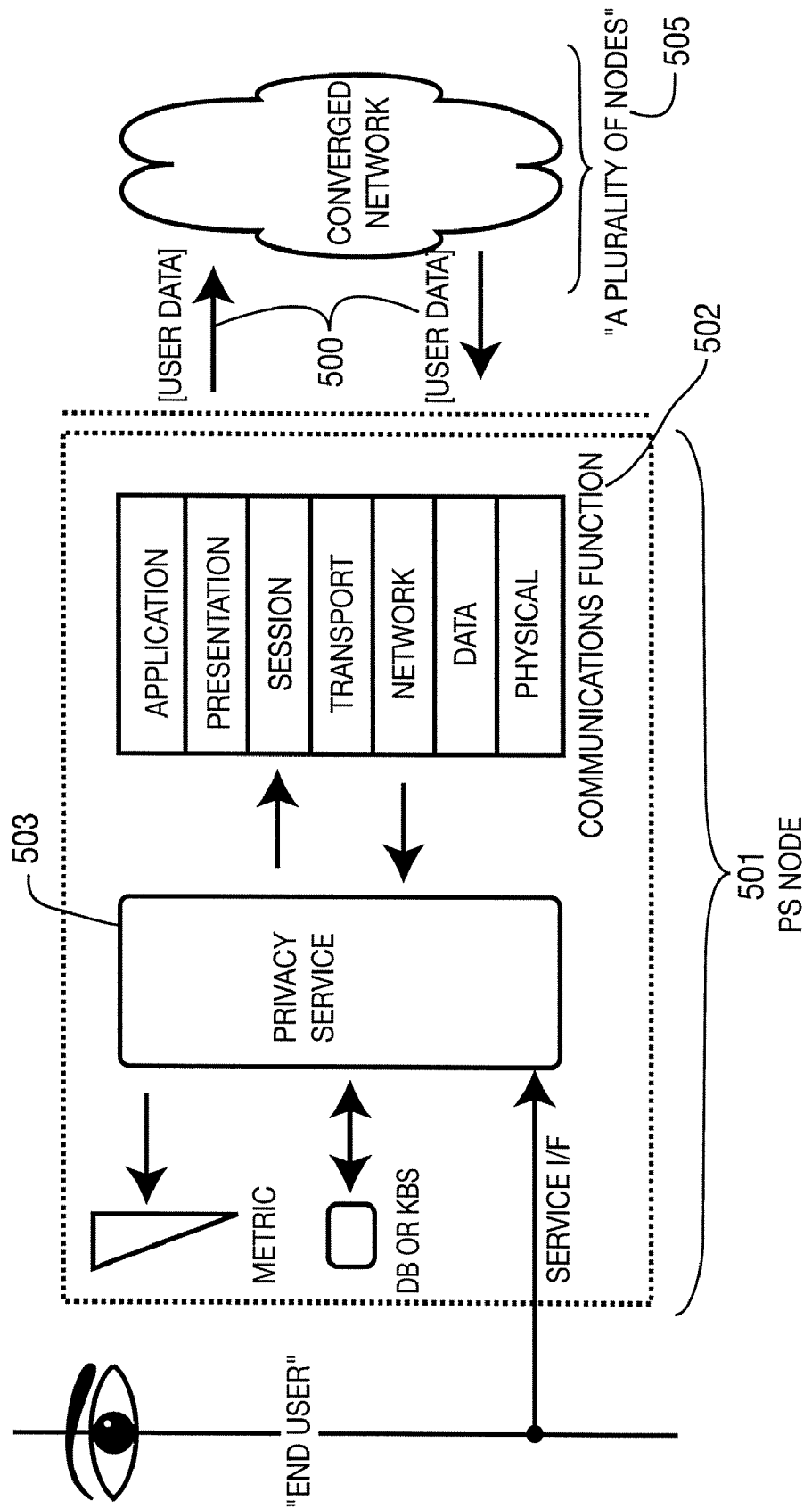
FIG. 5 is a schematic diagram of a PS node connected to a plurality of nodes in a the converged network.

Referring to FIG. 5, a PS node 501 is used to communicate with other nodes 505 in the converged network via an interface 500 through which User Data flows. Where the interface 500 is via a wireless medium, the PS node is configured as a WTRU. Each PS node 501 includes a communication component 502 and a PS component 503. The communication component 502 is configured to provide the communication connectivity with the converged network 505. A preferred protocol stack configuration for the communication component 502 is illustrated in line with a classic Open Systems Interconnection (OSI) model representation. The PS component 503 is configured to control the communication component 502 to allow the user to control the privacy secrecy of each data transmission. Preferably, PS node implementations include configuring the PS component 503 to control the privacy and secrecy of User Data processed in one or more layers of data processing configuration of the communication component 502 using Unified Trust, Rights, Identity, Privacy and Security (UNITRIPS) parameters. Where the parameters of Trust, Rights, Identity and Security are used to control a Privacy policy implemented by the PS, the PS node 501 is referred to as a UNITRIPS node.

An identity element is preferably the association of tangible elements to a node pertaining to an end user in order to discern uniquely the node and possibly the end user in a given application, context, and time. Three example types of identity include assumed identity, assigned identity, and abstracted identity.

Assumed identities can be both timeless and unconditional. They preferably embody the true personal digital identity of the WTRU and are owned and controlled entirely by the end user, for their sole benefit.

Assigned identities are preferably both conditional and temporary in their issuance to the end user. Typically, these identities are assigned or issued, in the context of a relationship or communication schema. For example, nearly every identity in a work environment is an assigned identity (e.g. job title, cell phone number, air miles number, social security number etc).

Abstract identities describe some abstraction of an identity either applied by the end user or by a third party on behalf of an end user. This abstraction might be based upon demographics, behaviors etc. A "frequent buyer" or "one time customer" assignments are examples of identity abstractions.

The trust element preferably measures the exposition of user data between nodes with some degree of confidence that the involved parties, a WTRU and targets, will adhere to certain rules. Typically the greater the trust element, the more likely a WTRU will assume that a data transmission will not be misused by the target. With a high degree of trust in the communication, the targets believe that there is some degree of quality associated with the communication schema obtained.

The rights element preferably defines a set of rights, such a usage rights, from a list of established or user defined rights. For example, whether data is to be read only, editable, available for a specific time period, or any other type of right or restriction one may wish it associate with user data.

The security element is a measure of the process of providing controlled access to the data message while in transit (between nodes), and while in storage (at a node). A secure communication between two nodes is preferably accomplished by a gestalt of six logical components: confidentiality, integrity, non-repudiation, authentication, authorization, and availability.

The time, application, and context signals are preferably not directly factored into the metrics, however, the PS preferably takes into account these elements in determining the metric. Embodiments of the PS, whether local or remote, are preferably provided with signals indicating the specific factors of application, context and time in relation to a particular piece of user data. The privacy is correlated to these factors. For example, sending a piece of user data unencrypted may not be privacy impacting in a particular context, e.g. location. The same may be true in relation to a particular application, e.g. name/date-of-birth data shared within a family social network application, or at a particular time or time elapsed, e.g. something needed to be kept private at one time, may not need to remain private three months later.

The PS may be configured to apply a weighting scheme to each of the service elements based on the time, application and context. A weighting scheme is a means of tuning aspects of the PS to reflect particular time, application and contexts. Weighting schemes are preferably defined in the user determined policy and may be different for each data transmission.

The time factor may be measured as either (1) instantaneous time (e.g. time of day, date etc), or (2) elapsed time (e.g. 1-week, 5-years etc.). The elapsed time relates to the lifetime of user data in the system. From a conceptual privacy perspective elapsed time is important because what is private today may not be private a week or a month from now.

The application factor is defined as the reason or motivation for the data transmission, e.g. communication between a seller and a buyer, or the purpose of sending or receiving a data transmission. Other examples include end user interfacing layer-7 or equivalent software embodiments, such as e-mail in a node used to facilitate the application.

The context factor is any measurable attribute (or grouping thereof) of a data transmission that describes a circumstance of the data transmission that is unique or at least differentiable. Typical examples of context will include but are not limited to: location, presence, behavior, environment, proximity to other entities, current roles of the communicating parties, the transport technology in use, the reputation of the third-party, past history or knowledge of previous communications, and regulation in effect.

The user determined policy is a statement that outlines a constraint, a restriction, a limitation, or a goal state relating to the handling of user data in a data transmission, where user data is any digital information or content that is created either voluntarily or involuntarily by an end user, or on behalf of an end user (via a node in the converged network). The policy may also extend to include a defintion of actions to be carried out in the event where the policy is violated. An example of this is the controls which could be defined by the policy.

The term "controls" is used here to describe any action that may be performed by a service element or by an end user, possibly as a result of a policy infringement or a metric report that results in some observable internal or external state change executed for the purpose of addressing said event.

The controls and the policy may be adjusted or set using a service interface. A service interface is a point of interaction that allows the end user to interact with the PS in a node. This interaction may be for the purposes of (a) defining, interrogating and modifying a policy, (b) the interrogation of a metric, (c) application of controls possibly in response to a metric. The service interface may allow the end user to interact with the PS on a real-time and/or a non-real time basis. This interaction may be realized in a passive (e.g. pre-configured) or proactive manner. Where the PS is embodied in an End User Node, direct real-time communication is readily available. However, where the PS of an End User is embodied in a network node or otherwise remote component, real-time communication may be available dependent upon the type of communication link between the End User and the PS.

Figure 8:
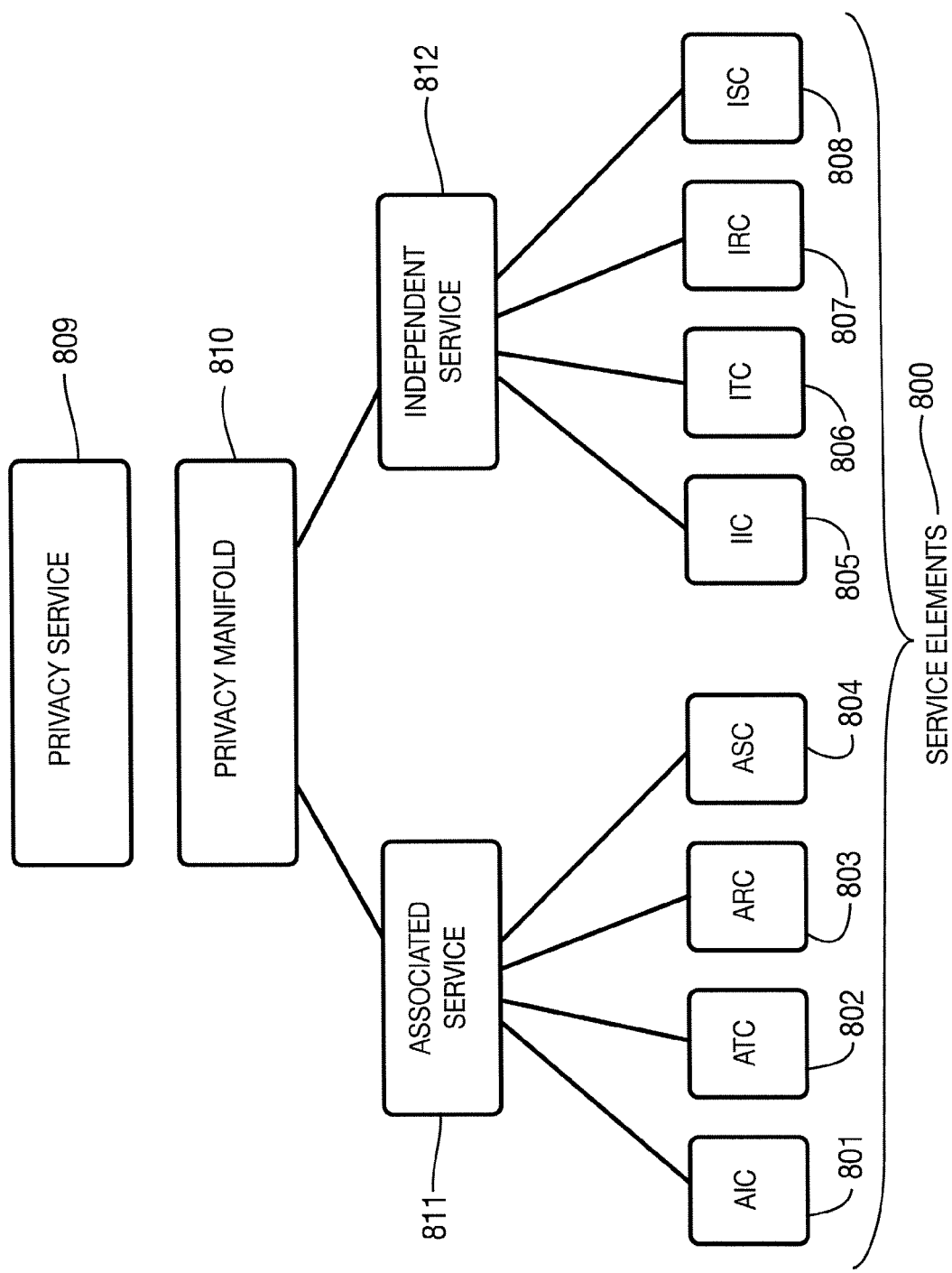
FIG. 8 is a block diagram of example service elements including eight types of measurable elements.

FIG. 8 illustrates one preferred configuration of the structure of a PS 809. The PS 809 is preferably configured to provide associated service 811 and independent service 812 for controlling the privacy of user data. The PS 809 preferably operates in conjunction with service elements 800 that preferably include associated and independent sets of the four preferred types of measurable elements. In this embodiment, primary elements include associated identity control 801 and independent identity control 805, associated trust control 802 and independent trust control 806, associated rights control 803 and independent rights control 807, and associated security control 804 and independent security control 808.

The associated elements 801-804 and independent elements 805-808 are preferably embodied as individual or combined software functionality that can run independently or together. When the associated and independent services are configured to operate together the result is a Privacy manifold 810. In the privacy manifold 810, the metrics produced by each component are combined to yield an instantaneous statement or metric on the user data current privacy level. In a fully embodied converged network, the end user is likely to be constantly producing and consuming information. At the same time, user data that may be completely unrelated or "independent" of an immediate or "associated" communication, of the same end user may be propagated and manipulated by other parties or between other nodes. Therefore, privacy is measurable both on an instantaneous basis as well as over a selected period of time. If measured over a period of time, privacy can be based on all of the actions a user makes, on all user data. This includes decisions a user makes at first propagation, e.g. what level of encryption you chose to apply, and decisions other users make at future propagations, e.g. what level of encryption other users choose to apply when subsequently propagating information relating to the first user.

Figure 6:
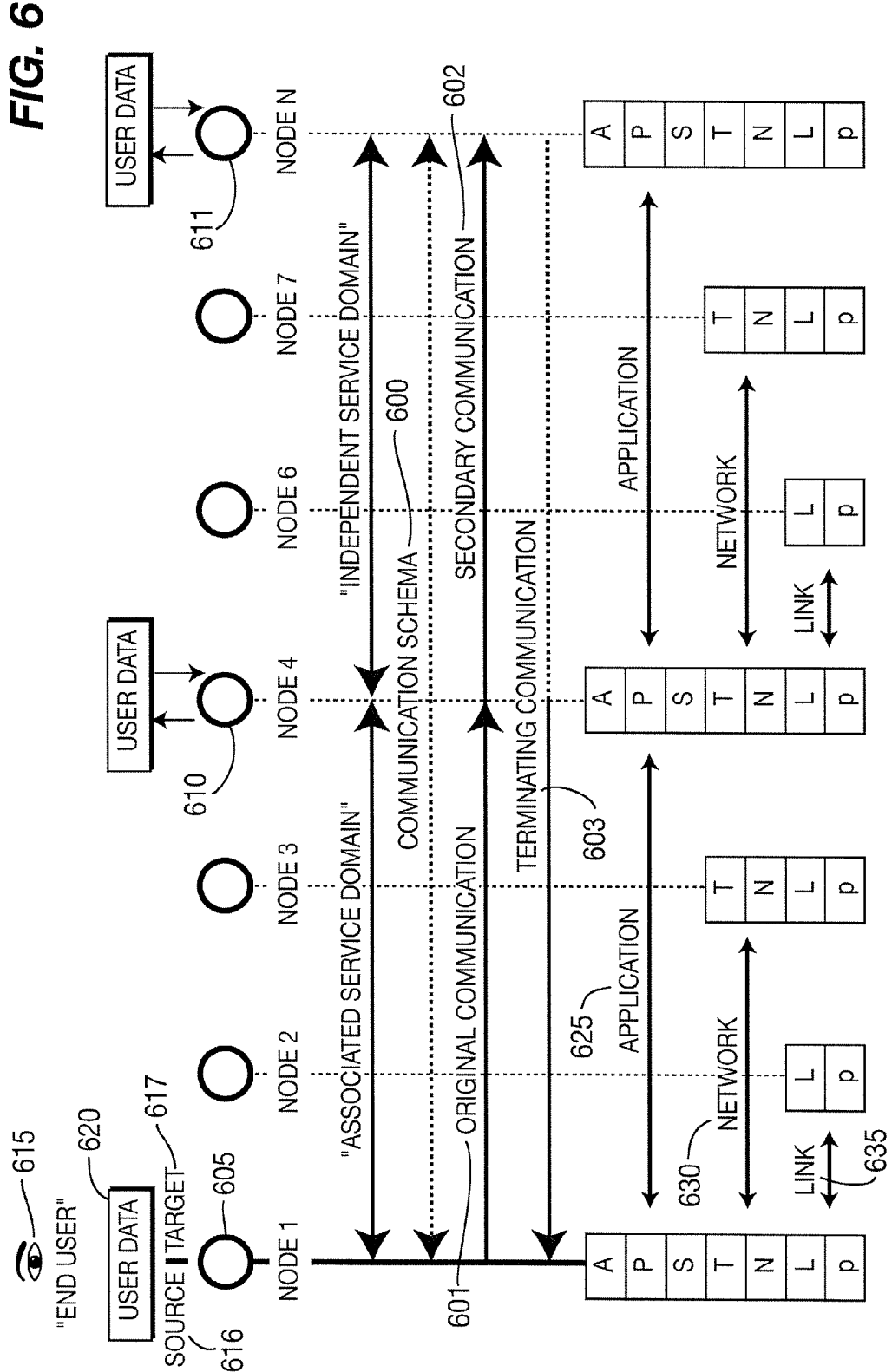
FIG. 6 is an exemplary diagram of the life span of a communication schema.

The control of any type of data communication between two or more nodes including the manipulation of data at a node can be denominated as a communication schema. FIG. 6 illustrates various forms a communication schema 600 with respect to User Data subject to PS control in terms of three basic types: an original communication 601, a secondary communication 602 and a terminating communication 603. An end user 615, shown in FIG. 6, may be a source 616 or a target 617 of user data 620 which is the subject of the communication schema 600. In the illustration of FIG. 6, the original communication 601 sends user data 620 from Node 1 606 as a source node to Node 4 610 which receives the user data as a target node. The PS includes control of the data manipulation at Node 4 610 with respect to the original communication 601.

The secondary communication 602 illustrates a subsequent sending of the User Data 620 received from the End User 615 by Node 4 610 to a Node N 611 as a secondary or subsequent target node for manipulation or simply for propagation in the converged network. The secondary communication is preferably sanctioned by the PS as communicated in the original communication 601 and includes PS control directed to Node N 611 with respect to the User Data 620.

A terminating communication occurs when User Data is sent to the End User's node. The terminating communication 603 illustrates user data 620 sent from Node 4 610 to Node 1 605 as Target 617 of End User 615. The PS preferably controls the reception of such User Data by the End User's node. As illustrated in FIG. 6, the PS preferably controls the communication schema using the application 625, network 630 and link 635 level components of these communications.

Figure 7:
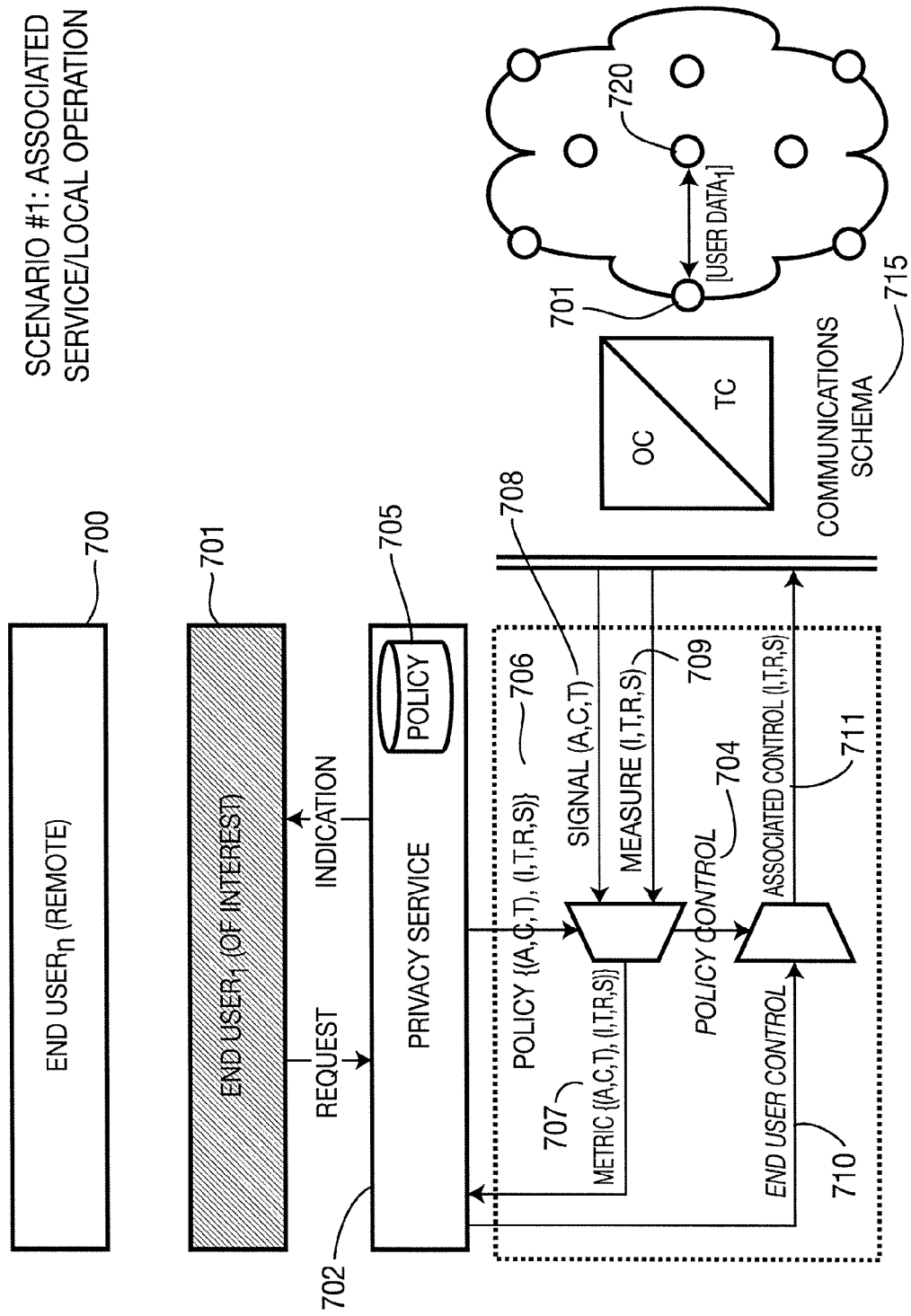
FIG. 7 is a flow diagram of an exemplary exchange of user data between an end user a target node.

FIG. 7 illustrates a preferred operation of an end user node 701 that is connected with a PS 702 engaged in an originating or terminating communication (OC/TC) with a target node 720. The PS 702 is preferably embodied in elements of client and server software in nodes in the converged network, e.g. client nodes and network nodes, and may form part of the end user node 701 itself.

During the course of the originating or terminating communication schema 715 between the end user node 701 and target node 720, signals and measurements are preferably extracted by an Associated Service of the PS 702.

The signals 708 are preferably used to identify the elements of instantaneous Application, Context, and Time of the communication schema. Measurements 709 preferably include identity, trust, rights and security measurements that are then used to identify instantaneous attributes associated with the elements of identity, trust, rights and security for the Associated Service of the PS 702. Together the signal attributes in connection with the respective measurements are preferably used to define the instantaneous conditions associated with the communication schema 715 that is with a user defined policy 705 with respect to the associated identity, trust, rights and security elements. The policy then adjusts the associated identity, trust, rights and security elements for the user data in terms of the communication schema 715 in question. In addition to the aforementioned attributes and a weighting scheme may be employed.

Preferably, the difference between the measured conditions of the service element and the policy is defined in a metric 706 generated by the PS 702. The policy preferably defines the metrics produced and how often. The metrics generated by the PS 702 may automatically invoke an associated control action 711. Alternatively, a user may invoke an associated control action 711 in response to an observed metric. This is shown in FIG. 7 as policy controls 704 and end user controls 710 respectively. The associated controls 711 as applied, serve to modulate some aspect of the local data transmission in order to better align instantaneous conditions with the policy requirements. This control is preferably related to associating attributes and controls with the transmitted user data, in the case of an originating communication and to associating attributes and controls with the received user data, in the case of a terminating communication.

Figure 9:
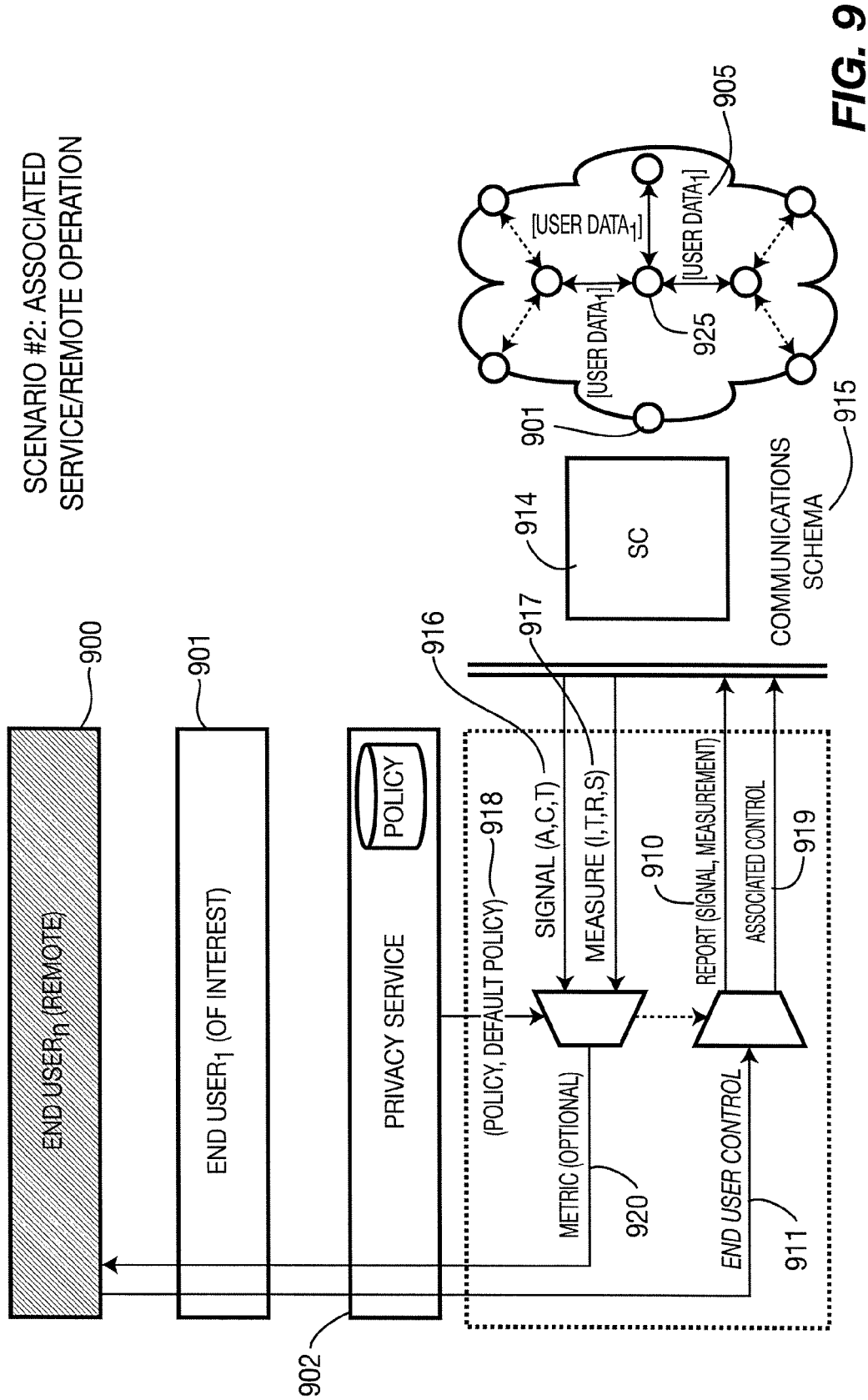
FIG. 9 is a flow diagram of an exemplary exchange of a secondary communication involving user data owned by an end user.

FIG. 9 illustrates the functionality of an Associated Service of a preferred PS 902 connected with End User 901 where a remote end user 900 is engaged in a secondary communication 914 with a node 925 involving User Data 905 owned by, or pertaining to the End User of interest 901. The remote end user 900 may be another end user who is acting on the End User of interests' User Data 905, e.g. watching a video created by the End User of interest and posted online. One difference between the "local" Associated PS Service functionality depicted in FIG. 7 and the "remote" Associated PS Service functionality depicted in FIG. 9 is that in "local" scenario, the End User of interest may readily act with respect to the End User's own User Data in real time.

During the course of the secondary communication 915, signals 916 and measurements 917 are preferably extracted by an Associated Service of the PS 902 on behalf of the End User (of interest) 901. As with the "local" Associated Service, the PS 902 uses the signal attributes and measurements to make a comparison with the policy previously established for the User Data. The PS 902 then preferably at a minimum generates a report that reflects the signal 916 and measurement 917 information which is made available to the End User (of interest) 901 either directly or via some proxy node, e.g. a privacy server as indicated by 910. If in view of the signal 916 and measurement 917 information, a policy 918 pertaining to the User Data 905 available from the PS, or embedded in the originally received user data, dictates a change in control of one or more Associated service elements, then associated controls 919 are preferably applied automatically via policy control 918. Optionally, a metric may be made available to the remote End User 900 to control some element of the PS in response to a received metric 920. The associated control then operates to control the communication or attributes associated with the User Data 905 as communicated to the End User 900.

Figure 10:
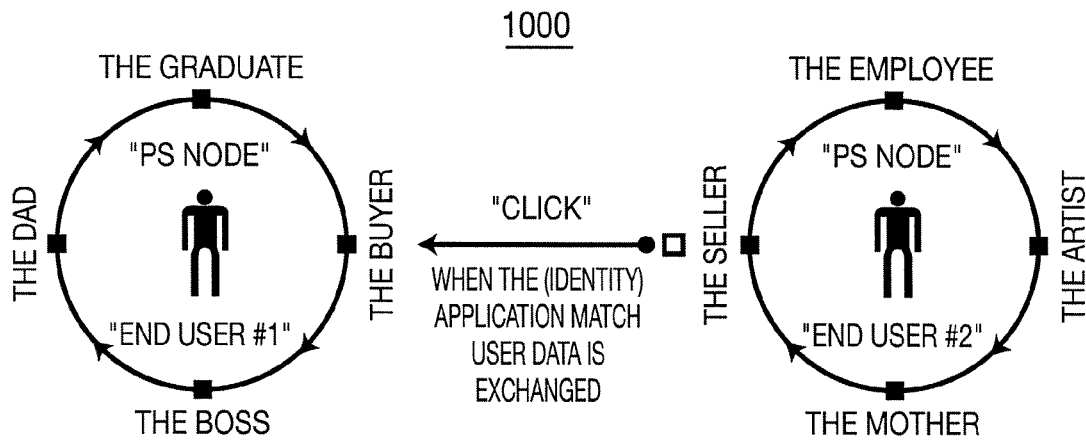
FIG. 10 is a schematic diagram of an associated identity control service element from the perspective of the sending and receiving end users.

FIG. 10 illustrates in more detail an associated identity control service 1000 element, introduced earlier with respect to FIG. 8 AIC 801, from the perspective of sending and receiving End Users. The associated identity control service element preferably allows a PS to provide the End User that it serves with dynamic controls over the identity associated with the End User's User Data within an instantaneous communication schema. For example, in a scenario where User Data is being sent over a radio link, the identity control service element is configured to ensure that the End User's identity remains protected and safeguarded as defined per the End User's policy definition. The policy definition may include different identities applicable for different instantaneous Application, Context, or Time. This service element preferably utilizes Application, Context, or Time attributes of a subject communication schema to apply the instantaneous best choice for each category in order to meet the policy definition.

Preferably the associated service of the PS uses the associated identity control (AIC) service element to provide a performance metric ($AIC_s$) that describes the instantaneous identity level applied in the communications schema. This metric is preferably defined such that any deviation ($AIC_{sd}$) from the policy ($AIC_{sp}$) can be quantitatively or qualitatively identified. Metrics generated by the associated identity control service element (e.g. $AIC_{sd}$) may also be used to control or effect changes to one or more of the other component service elements. For example, the determination of an "anonymous" identity classification by the associated identity control may result in associated security control applying an increased level of encryption on a particular link.

In receiving User Data, the PS preferably uses the associated identity service element to provide the End User with dynamic control over the identity exposed for the purposes of receiving User Data within an instantaneous communication schema. For example, in a scenario where User Data is being received over a radio link, the AIC service element preferably provides the End User is configured to limit the exposure of the End User's identity per the End User's policy definition. The End User's policy preferably includes different identities or levels of identity for different instantaneous Application, Context or Time. The AIC service element preferably determines the Application, Context or Time from the signal associated with a communication schema to recommend or allow only communication of User data and associated information in conformance with the associated policy definition.

An example of a communication schema for an Application related to the purchase and sale of goods or services is illustrated in FIG. 10. In this example, the AIC service element of the PS serving End User #1 provides the identity of a Buyer during the communication. The AIC service element of the PS serving End User #2 provides the identity of a Seller during the communication. With the identities in place User Data of End User #2, such as selling price and/or quantity or quality attributes of the subject sale, is then communicated to End User #1. Similarly, User Data of End User #1, such as offering price and use requirements, can also be communicated to End User #2.

Figure 11:
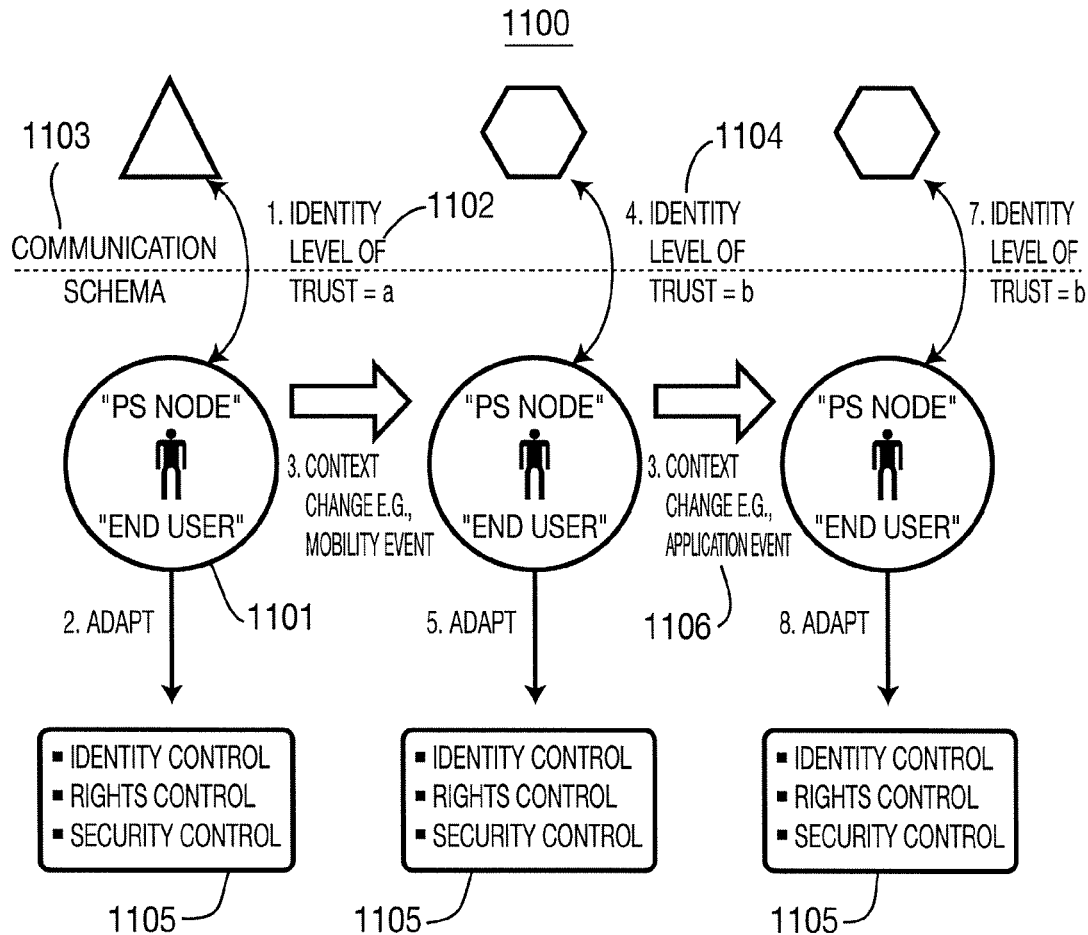
FIG. 11 is a schematic diagram of an associated trust control service element.

FIG. 11 illustrates an associated trust control (ATC) service element 1100 introduced earlier with respect to FIG. 8 ATC 802. The associated trust element is preferably defined in terms of sending and receiving of User Data by an End User. The Associated Service of a PS preferably uses the associated trust control service element to provide the End User with a metric that describes the instantaneous trust level associated with a communication schema. For example, in a scenario where User Data is being sent or received over a radio link, the ATC service element is preferably configured to ensure that an appropriate level of trust is established and maintained throughout the communication schema per the End User's policy definition. The End User's policy preferably includes different trust requirements for different instantaneous Application, Context, or Time attributes of a communication schema. The ATC service element preferably determines the Application, Context, or Time attributes from a signal associated with the communication schema and then preferably recommends or allows only communication schema in conformance with the End User's policy definition.

In the example of FIG. 11, an End User PS Node 1101 has established a level of trust equal to "a" 1102, in association with a particular communication scheme 1103. This trust metric is preferably used to assist in the configuration of the complementary component services 1105 for Identity, Rights and Security. Subsequently, such as by the ATC determining a Context change due to a mobility event, a new level of trust equal to "b" 1104 is established and component services 1105 preferably use this newly established trust level in controlling their respective User Data controls and attributes. In response to a further event, such as a Context change due to an application event 1106, the ATC determines no change in trust level is needed. However, it may still be necessary to reconfigure the other component services 1105 in response to the change independent of the maintenance of the same trust level.

The Associated service of the PS preferably uses the associated trust control service element 1100 to provide metrics ($ATC_s$, $ATC_r$) that describe the instantaneous level of trust in a particular communication schema. These metrics are preferably defined such that any deviation ($ATC_{sd}$, $ATC_{rd}$) from the End User's policy ($ATC_{sp}$, $ATC_{rp}$) can be quantitatively or qualitatively identified.

As reflected in FIG. 11, metrics generated using the ATC service element (e.g. $ATC_{sd}$) may result in changes to one or more of the other component service elements 1105. For example, the determination of a highly trusted communication schema by associated trust control may result in associated security control applying a reduced level of ciphering on a particular link. The metric is preferably implemented in continuous, discrete, alphabet or key based schemas. Deviation is preferably derived based on a distance scheme such as Euclidean or Hamming based schemes.

Figure 12:
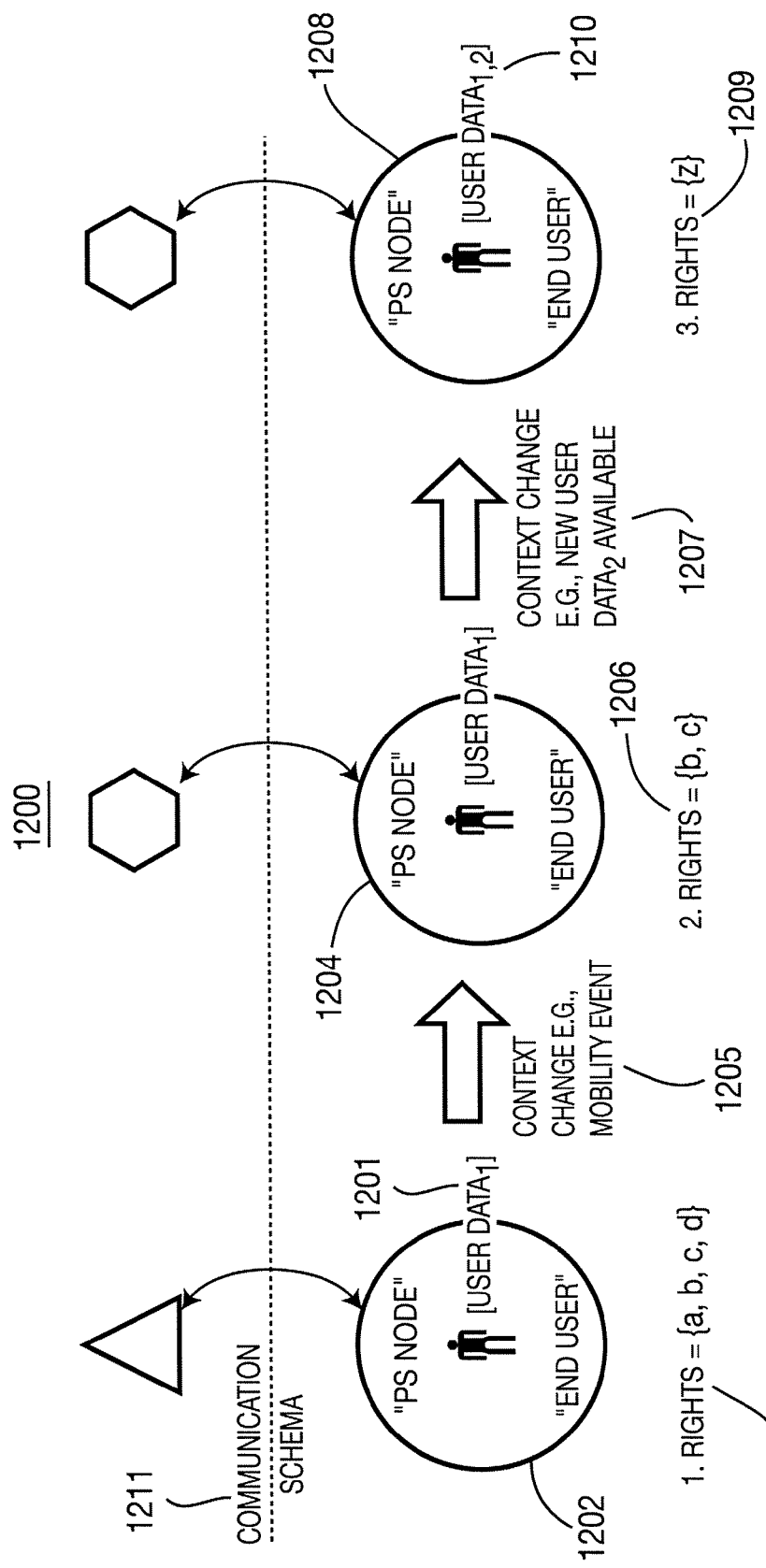
FIG. 12 is an example of an application of an associated rights control service element.

FIG. 12 illustrates the functionality of an associated rights control (ARC) service element 1200 introduced earlier with respect to FIG. 8 ARC 803. The associated rights control service element is preferably defined in terms of sending and receiving of User Data by an End User. From the sender prospective, the PS uses the ARC service element to provide an End User with dynamic controls over the rights associated with the End User's User Data within an instantaneous communications schema. As shown in FIG. 12, for example, User Data 1201 is to be sent over a radio link where the ARC service element is configured to ensure that the rights 1203 relative to the User Data remain protected and safeguarded from alteration per the End User's policy. The End User's policy definition preferably includes different rights or levels of rights for different instantaneous Application, Context or time. The ARC service element is preferably configured to determine the Application, Context or Time from the signal associated with a communication schema to apply an instantaneous best choice to meet the policy/communication schema requirements.

In FIG. 12, the functionality of an ARC service element with respect to a communication schema involving an End User PS Node is illustrated progressing through three stages 1202, 1204 and 1208 with respect to different User Data communications generally indicated by communication schema 1211. In an initial stage 1202, the rights 1203 associated with a particular user data element of interest are defined by a set of rights {a, b, c, d} with respect to User Data1 based on the End User's Policy and a first communication. Subsequently, with respect to another communication with a different node, the ARC service element determine a Context change such as via a mobility event 1205 in the further communication and implements a reduced set of rights {b, c} 1206 with respect to User Data1 in accordance with the End User's policy. Another stage 1208, additional data, User Data2 1207, becomes available in connection with a second further communication. Such an agglomeration of data can be used as a further Context factor used by the ARC element service to select a new set of rights {z} 1209 in accordance with the End User's Policy to be applied to the combined User $Data_{1,2}$ 1210 the second further communication of User Data.

The sender ARC service element preferably provides a metric ($ARC_s$) that describes the instantaneous rights level applied in the respective communication. This metric is preferably defined such that any deviation ($ARC_{sd}$) from the policy ($ARC_{sp}$) can be quantitatively or qualitatively identified.

Metrics generated by the ARC service element (e.g. $ARC_{sd}$) may also be used to result in changes to one or more of the other component service elements. For example, the determination of a need to provide a higher level of rights (than desired, per the policy definition) by associated rights control may result in associated identity control service applying an "anonymous" identifier in the present, or a future communication schema.

In connection with receiving user Data, the ARC service element preferably provides the End User being served with a continuous metric that describes the instantaneous rights level associated with a communications schema. For example, in a scenario where user data is being received over a radio link, this service element provides the end user with means to determine the level of rights allowed/recommended throughout the communications schema, per the End User's policy. The policy definitions may include different rights level requirements for different instantaneous Application, Context or Time attributes of the communication schema in which the User Data is communicated. The ARC service element is preferably configured to determine the Application, Context or Time from the signal associated with a communication schema to recommend or allow only rights in conformance with the associated End User policy.

The receiver ARC service element preferably provides a metric ($ARC_r$) that describes the instantaneous level of rights allowed in a particular communications schema. This metric is preferably defined such that any deviation ($ARC_{rd}$) from the policy ($ARC_{rp}$) can be quantitatively or qualitatively identified.

Metrics generated by the ARC receiver service element (e.g. $ARC_{rd}$) may be used to change one or more of the other component service elements. For example, the determination of a high allowed rights level (in a particular communications schema) by the ARC service element may be used by the associated trust control to "white-list" a particular communication schema at a relatively high trust level. The ARC metric is preferably implemented in continuous, discrete, alphabet or key based schemas. Deviation is preferably derived based on a distance scheme such as Euclidean or Hamming based scheme.

The functionality of an associated security control (ASC) service element is introduced earlier with respect to FIG. 8 ASC 804. The ASC service element is preferably defined in terms of sending and receiving of User Data by an End User. The ASC service element preferably provides an End User being served with a metric that describes the instantaneous security level associated with both sending and receiving User Data communications schema. For example, in a scenario where User Data is sent or received over a radio link, the ASC service element is preferably configured to ensure that an appropriate level of security, such as encryption level, site key confirmation, password protection, is established and maintained throughout the communications schema per the End User's policy definition. The End User's policy may include different security or levels of security for different instantaneous Application, Context or Time attributes of a communication schema. The ASC sender and receiver service element is preferably configured to determine the Application, Context or Time from the signal associated with a communication schema in order to apply the instantaneous best choice to meet the policy/communication schema requirements.

The ASC sender and receiver service element preferably provides metrics ($ASC_s$, $ASC_r$) that describe the instantaneous level of security in a particular communications schema. These metrics are preferably defined such that any deviation ($ASC_{sd}$, $ASC_{rd}$) from the policy ($ASC_{sp}$, $ASC_{rp}$) can be quantitatively or qualitatively identified.

Metrics generated by the ASC service element (e.g. $ASC_{sd}$) may result in changes to one or more of the other component service elements. For example, the determination of a limited security capability in a particular communication schema by the ASC service element may be used by the associated rights control to limit the rights to User Data being sent.

The ASC metrics are preferably implemented in a continuous, discrete, alphabet and/or key based schemas. Deviation is preferably derived based on a distance scheme such as an Euclidean or Hamming based scheme.

An Independent Service for a preferred PS such as illustrated in FIG. 8 preferably is configured to provide specialized services to an End User vis a vis the End User's User Data with respect to both source (i.e., sending) and sink (i.e., receiving) end users in secondary communications (SCs) of the User Data. The independent service preferably is configured to provide the End user with continued control over the End User's User Data outside of the original and terminal communication context. For example, in a scenario where User Data is stored in an arbitrary database outside the End User's immediate scope of influence, the Independent Service aspect of the PS provides the End User with the means to ensure that the End User's User Data remains protected and safeguarded per the End User's policy definition. This control is preferably minimally manifested by a metric that describes actions or events relating to the End User's User Data. The Independent service is preferably configured to perform protection and safeguarding actions outside of the End User's immediate scope of influence, such as the removal of a misused item of user data from an offending database.

The independent service preferably provides the End User with continuous metrics describing the attributes of the End User's User Data as received by a sink end user. The independent service metrics preferably describe the quality, ownership, allowed use (e.g. when, where), credibility etc. of the End User's User Data. These metrics may directly or indirectly influence subsequent use of the End User's User Data by the sink end user. The independent service may also be configured to perform protection and safeguarding actions inside or outside of the End User's immediate scope of influence, such as blacklisting a specific resource.

Metrics generated by an independent service element 812 of a PS 809 may result in changes to the behavior of the associated service element 811 of the PS and vice versa. For example, the blacklisting of a specific resource by the independent service may result in the associated service raising the privacy and security technology requirements in a future transaction, or the avoidance of a communication schema altogether.

An independent service of a PS is preferably defined by four functional service elements: independent identity control, independent trust control, independent rights control and independent security control. Independent service operation from the perspective of an End User being served by the PS is described more fully in terms of two normative scenarios illustrated in FIGS. 13 and 14 in connection with which preferred basic operational requirements of the service in "local" and "remote" contexts are described from the perspective of the End User of interest being served by the PS.

Figure 13:
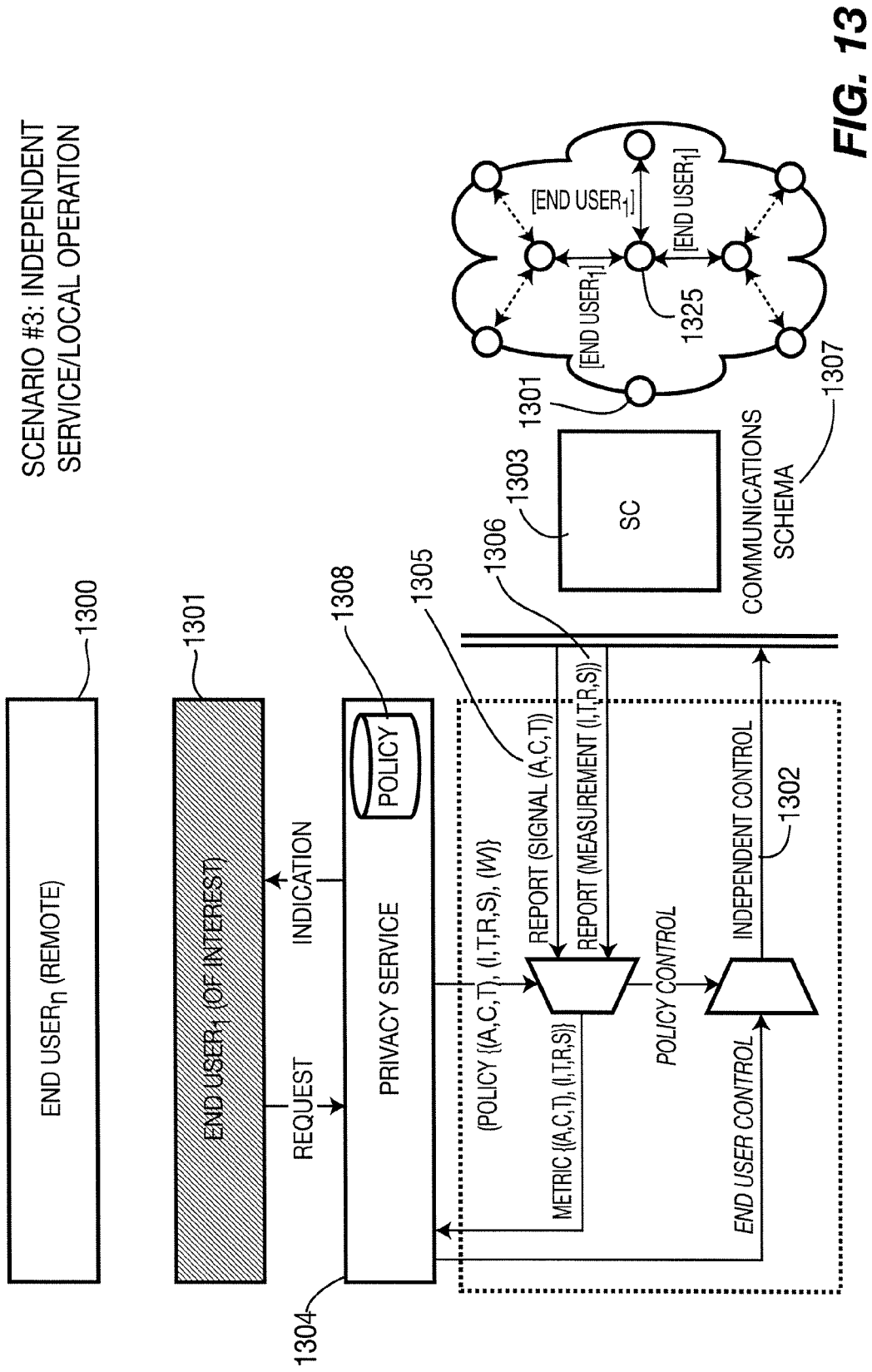
FIG. 13 is a flow diagram of an exemplary exchange of user data in which an end user receives reports containing signals and measurements pertaining to one or more secondary communications.

FIG. 13 illustrates a "local" scenario for an End User of interest 1301 that is being served by a PS 1308 that receives reports containing signals 1305 and measurements 1306 pertaining to a communication schema 1307. In the Independent Service situation, the communication schema are secondary communications 1303, between for example a node 1325 and the node of a remote end user 1300. Preferably, the End User's policy in effect with the User Data causes the reports to be sent with respect to the Application, Context, and Time attributes of the secondary communication 1303 and the identity, trust, rights and security service elements.

The contents of these reports 1305, 1306 are preferably processed in a manner corresponding to the processing of the signals 708 are preferably used to identify the elements of instantaneous Application, Context, and Time of an originating or terminal communication and identity, trust, rights and security measurements 709 that are then used to identify instantaneous attributes associated with the elements of identity, trust, rights and security for the Associated Service of the PS 702 as discussed in connection with FIG. 7.

Together the contents of the A,C,T and i, t, r, s reports 1305, 1306 are preferably used to define the instantaneous conditions associated with the communication schema 1307 with a user defined policy 1308 with respect to independent identity, trust, rights and security elements. The policy 1308 then adjusts the independent identity, trust, rights and security elements for the User Data in terms of the communication schema 1307 in question via the sending of an independent control 1302. In connection with the policy generation of the independent control, a weighting scheme may be employed.

Preferably, the difference between the reported conditions of the service element and the policy is defined in a metric generated by the PS 1308. The policy preferably defines the metrics produced and how often. The metrics generated by the PS 1308 may automatically invoke an independent control action 1302. Alternatively, the End User 1301 may invoke an independent control action 1302 in response to an observed metric reported by the PS 1304. This is shown in FIG. 13 as policy control and end user control, respectively. The independent controls 1302 as applied, serve to modulate some aspect of the data transfer in the secondary communication 1303 in order to better align instantaneous conditions with the policy 1308 requirements.

Figure 14:
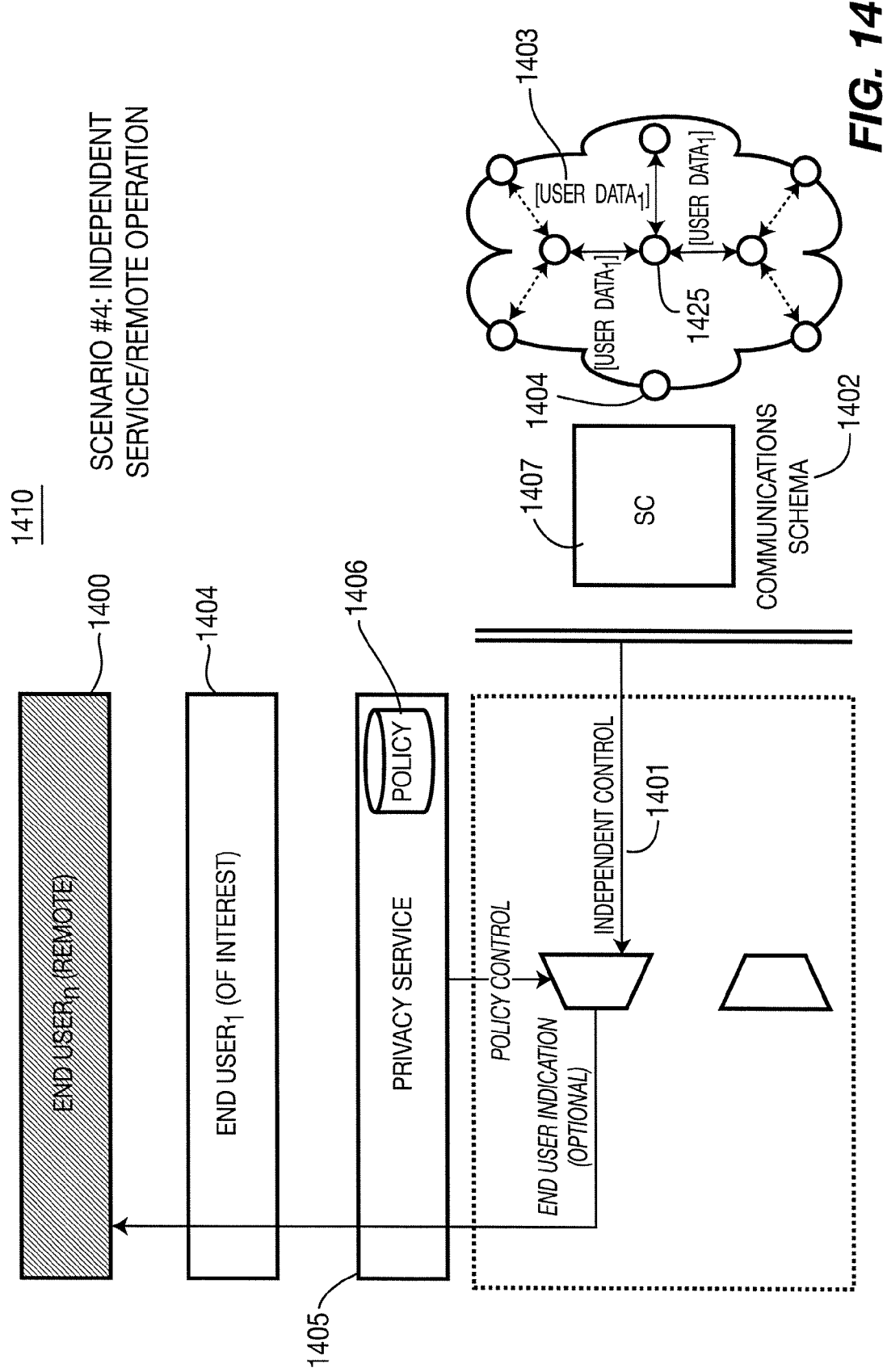
FIG. 14 is a flow diagram of an exemplary exchange of user data in which a remote end user receives an independent control indication.

FIG. 14 illustrates a "remote" scenario for an End User of interest 1404 that is being served by the PS 1405 receives an independent control indication 1401 pertaining to a communication schema 1402. In the Independent Service situation, the communication schema are secondary communications 1407, between for example a node 1425 and the node of a remote end user 1400. Preferably, the independent control indication 1401 is signaling propagated across a network in connection with the transfer of User Data that had been originated with End User of interest 1404 and is subject to End User Policy 1406, such as a command pertaining to one or more of the service elements (I, T, R, S) that may invoke a behavior change at the receiving End User node 1400.

This indication may pertain to an instantaneous communication schema or may relate to a behavior required in a future communication schema 1402 that involves user data 1403 owned by, or pertaining to the End User (of interest) 1404. Upon receipt of this indication, the PS1405 preferably updates the policy 1406 pertaining to the User data 1403 which may optionally result in an indication sent to the receiving End User 1400. In such case, the remote End User may then invoke an associated control action (not shown in FIG. 14), as discussed in connection with FIG. 9.

FIG. 15 illustrates in more detail an independent identity control service 1500 element, introduced earlier with respect to FIG. 8 IIC 805, from the perspective of sending (source) and receiving (sink) end users of a secondary communication. The independent identity control service element preferably allows a PS to provide the End User that it serves with control over the identity associated with the End User's User Data within communication schema of secondary communications, i.e. after an original communication. For example, in a scenario where the End User's User Data is stored in an arbitrary database somewhere outside of the End User's immediate scope of influence, the IIC service element 1500 is preferably configured to ensure the End User's identity remains protected and safeguarded per End User's policy with respect to both the source and sink users. A source could be any database where the End User's User Data finds itself during its or the End User's lifetime, such as a medical database. Such a database or other type of node in a converged system would preferably be enabled with PS functionality, i.e. an appropriate hardware or software component, to assure proper operation of the PS.

The IIC service element may include different identities, preferably with the ability to include identities different from the original communication, for different secondary communications based on application, context, and time factors. The IIC service element 1500 preferably uses application, context, and time factors to apply the End User's policy.

FIG. 15 provides an extrapolation of the AIC example presented in connection with FIG. 10 as applied to a secondary communication and IIC service element to illustrate an original identity application violation. Two end users 1501, 1502 have several identities. In an original communication 1505 where the PS serves End User #1, identities relevant in original communication 1505 define the mutual relationship as those with the identity of "the buyer" 1503 with respect to End User # 1 and "the seller" 1404 with respect to End User #2. The End User #1's Policy with respect to the IIC service element could be set to maintain these identities for secondary communications. Accordingly, an identity application violation for the PS serving End User #1 will occur if the User Data sent from "the buyer" 1503 to "the seller" 1504 is used or proliferated by any other identity associated with End User# 2.

The IIC service element 1500 preferably provides a metric ($IIC_s$,) that describes the performance of the identity controls applied in a (secondary) communication schema. This metric is preferably defined such that any deviation ($IIC_{sd}$) from the policy ($IIC_{sp}$) can be quantitatively or qualitatively identified.

Metrics generated by this IIC service element 1500(e.g. $IIC_{sd}$) may be used by one or more of the other component service elements to change or take specific mitigation actions. For example, repeated identity application violations could trigger a security action to result in the removal of the user data from the third party Node. In another example, the IIC metric can be used by an independent trust control to "blacklist" a particular communication schema.

The IIC metrics are preferably implemented in a continuous, discrete, alphabet and/or key based scheme. Deviation is preferably derived based on a distance scheme such as an Euclidean or Hamming based scheme.

Figure 16:
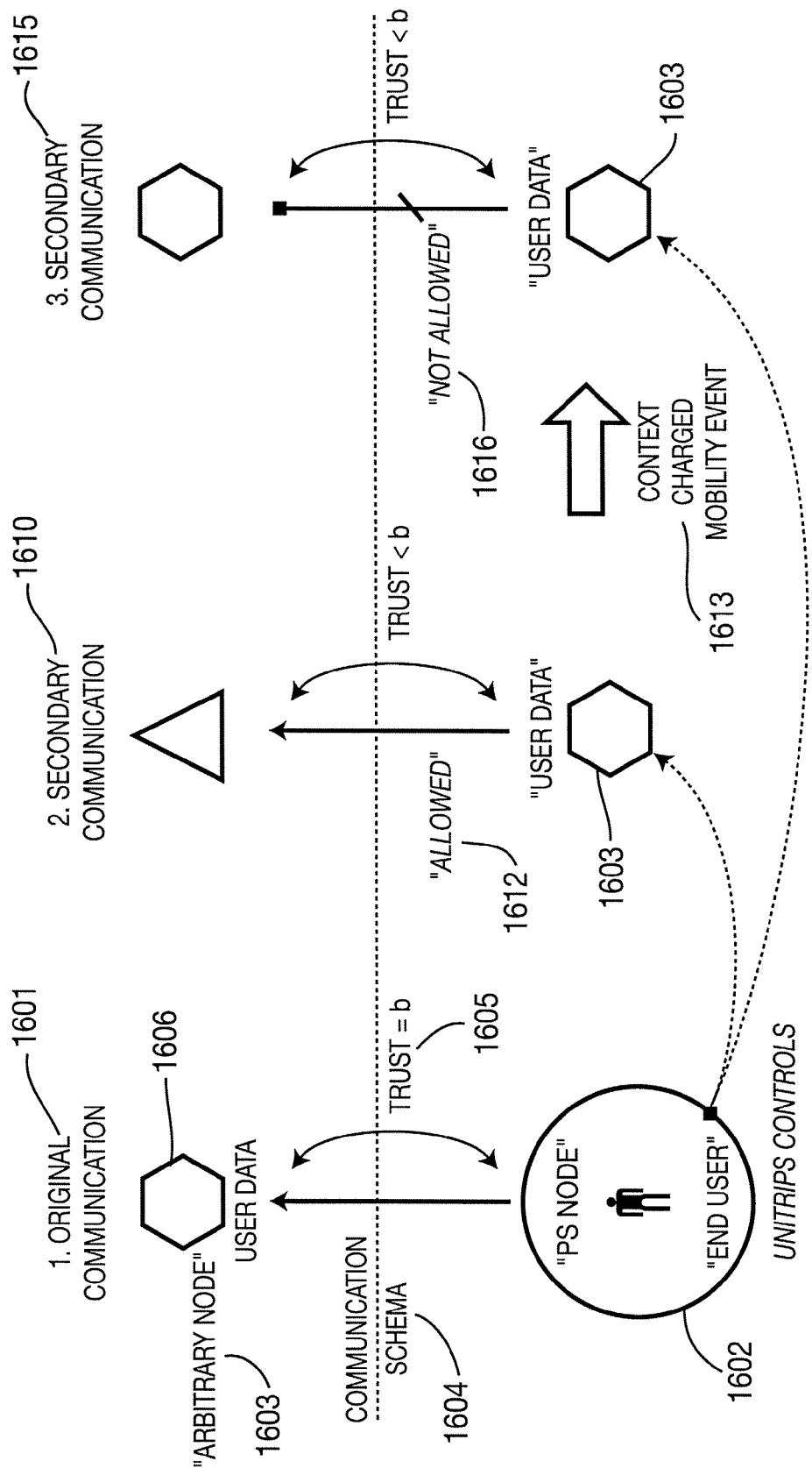
FIG. 16 is an exemplary diagram of an original communication between an end user/node and an arbitrary node in the converged network.

FIG. 16 illustrates in more detail an independent trust control service element, introduced earlier with respect to FIG. 8 ITC 806, from the perspective of sending (source) and receiving (sink) end users of a secondary communication. The ITC service element preferably provides an End User with continued control over the trust schema associated with the End User's User Data after an original communication. For example, in a scenario where the End User's User Data is stored in an arbitrary Node outside the End User's immediate scope of influence, the ITC service element is preferably configured to ensure that the End User's User Data is proliferated only via trusted communication schema per the End User's policy definition. The End User's policy may include different trust level requirements, including trust levels different from the original communication of the User Data, for different secondary communications Application, Context and Time factors. The ITC service element is preferably configured to use the Application, Context and Time factors attributable to a communication schema to enforce the End User's policy definition.

FIG. 16 shows an original communication 1601 between an End User node 1602 served by the PS and an arbitrary node 1603 such as in a converged network. In the original communication 1601, the associated trust control (ATC) service element assesses the communication schema 1604 and sets a trust metric to have a level of trust=b 1605 in accordance with the End User's policy definition and a user data 1606 exchange proceeds. The result is that User data 1606 is now stored in the arbitrary node 1603 and the ITC may use the trust level "b" as a default on initial level for operation and application to future secondary communications.

When the arbitrary Node 1603 conducts a secondary communication 1610 for the purposes of sending the User Data to another node, the ITC may, for example, assess the trust level of the proposed communication schema 1610 to be less than before, trust<b. However, with available modifications to other independent component services, it may result that the policy definition is still satisfied due to changes in other elements and the communication is "allowed" 1612. The level of risk, i.e. policy deviation, is preferably captured by the ITC service in an $ITC_{sd}$ metric.

Subsequently, the arbitrary node 1603 may undergo a context change, e.g. a mobility event occurs 1613. In the provided example, upon attempting to execute a secondary communication 1615 involving the User Data where the trust metric is below that originally set, trust<b, a rejection 1616 may occur since there were no overriding factors to warrant satisfaction of the End User policy by other independent control elements.

The ITC service element preferably provides a metric ($ITC_s$) that describes the performance of the trust controls applied in a secondary communications schema. Such metric is preferably defined such that any deviation ($ITC_{sd}$) from the policy ($ITC_{sp}$) can be quantitatively or qualitatively identified.

Metrics generated by the ITC service element (e.g. $ITC_{sd}$) may result in be used by one or more of the other component service elements to make changes or specific risk mitigation actions. For example, repeated trust violations may result in an independent rights control service modifying the rights associated with the User Data in the third party Node.

The ITC metrics are preferably implemented in a continuous, discrete, alphabet and/or key based scheme. Deviation is preferably derived based on a distance scheme such as an Euclidean or Hamming based scheme.

FIG. 17 illustrates in more detail an independent rights control service element, introduced earlier with respect to FIG. 8 IRC 807, from the perspective of sending (source) and receiving (sink) end users of a secondary communication. The IRC service element preferably provides an End User with continued control over the rights associated with the End User's User Data after an original communication.

For example, in a scenario where user data is stored in an arbitrary Node outside the end user's immediate scope of influence, the IRC service element is preferably configured to ensure that End User's User Data rights remain in force per the End User's policy definition. This policy may include different rights, including different sets of rights from the original communication, for different Application, Context and Time factors related to a secondary communication schema. The IRC service element is preferably configured to use the Application, Context and Time factors attributable to a secondary communication schema to enforce the End User's policy definition.

The IRC service element preferably provides a metric ($IRC_s$) that describes the performance of rights controls applied in a secondary communications schema. This metric is preferably defined such that any deviation ($IRC_{sd}$) from the policy ($IRC_{sp}$) can be quantitatively or qualitatively identified.

Metrics generated by this service element (e.g. $IRC_{sd}$) may be used by one or more of the other component service elements to make changes or specific risk mitigation actions. For example, repeated reports of rights violations, e.g. usage or attempts of usage of user data in unwarranted locations, by the IRC service element may result in the independent trust control "black-listing" a particular node.

The IRC metrics are preferably implemented in a continuous, discrete, alphabet and/or key based scheme. Deviation is preferably derived based on a distance scheme such as an Euclidean or Hamming based scheme.

FIG. 17 illustrates the functionality of the IRC service 1700. In Stage 1, User Data 1701 is stored in an arbitrary Node 1702 following an original or secondary communication. At this point the IRC service has established in connection with the relevant End User policy a set of Rights 1703 associated with the User Data 1701, i.e. rights set {a, b, c, d}. In a second Stage 2, the user data 1701 is sent to a second Node 1704 in a secondary communication. In connection therewith, a Context change, such as one related to the User Data destination, has triggered the IRC service to alter the established rights and a new set of rights 1705 is established for the User Data at node 1704, i.e. rights set {x, b, g, d}.

In a further Stage 3, an example of the interaction between the IIC, IRC and ISC elements is provided. In this case, the destination of the user data 1701 does not make a change of nodes, but the location 1706 of the arbitrary Node 1704 containing the user data has changed. This location 1706 change is detected by the IIC service entity. Subsequently, the IRC limits the rights associated with the User Data to rights set {b} 1707 as a result in a change in the IIC metric which may have also effected an ISC metric. As shown, in this example, the IRC service also includes an indication $ in the rights 1707 that reciprocity to the source is required in order to use the User Data. The ISC service then preferably prevents access to the User Data 1701 until the reciprocity requirements are met.

The independent service control service element, introduced earlier with respect to FIG. 8 ISC 808, is preferably defined from the perspective of sending (source) and receiving (sink) end users of a secondary communication. The ITC service element preferably provides an End User with continued control over the security measures applied to the End User's User Data after an original communication. For example, in a scenario where User Data is stored in an arbitrary node outside the End User's immediate scope of influence, the ISC service element is preferably configured to ensure that the End User's User Data is (a) stored and manipulated in a node, and (b) proliferated by a node in accordance with the End User's policy. This policy definition may include different security mechanisms, including different security mechanisms from those used with the original communication, for different Application, Context, and Time factors of a secondary communication schema. The ISC service element is preferably configured to use the Application, Context and Time factors attributable to a communication schema to enforce the End User's policy definition.

The ISC service element preferably provides a metric ($isc_s$) that describes the security controls applied in a (secondary) node and communications schema. Such metric is preferably defined such that any deviation ($ISC_{sd}$) from the policy ($ISC_{sp}$) can be quantitatively or qualitatively identified.

Metrics generated by this service element (e.g. $ISC_{sd}$) may be used by one or more of the other component service elements to make changes or specific risk mitigation actions. For example, detection of repeated transmissions of User Data within a given time period may result in the generation of a security level metric change that in turn is used by the IRC element service to modify the rights associated with one or more elements of User Data.

The ISC metrics are preferably implemented in a continuous, discrete, alphabet and/or key based scheme. Deviation is preferably derived based on a distance scheme such as an Euclidean or Hamming based scheme.

A preferred PS 809 as illustrated in FIG. 8 supports the generation of a privacy manifold 809 having the full complement of independent and associated service elements as described above. Real privacy may also be described qualitatively as a function of how well an End User protects itself as well as how well others do the same. In connection with the PS 809, a quantitative measure of the former is provided by locally generated associated metrics. The latter is provided by the independent metrics generated by one or more remote Nodes based on the policies established via the PS by the End User. Together, this stream of metrics used by the PS defines a manifold of information describing the real privacy experienced by the End User.

One can look at the stream of metrics generated by the PS as a discrete time series and, in the case of multiple sources, a multidimensional time series or set of time series. A traditional signal processing techniques of classification, filtering, transformation, and abstracted representation, e.g., a sine wave and, thus, transformation a a0 a1 a2 a3 . . . into a Asin(wts.n), can advantageously be applied to the time series of metrics in order to provide a more scalable manipulation of the User Data by the PS, i.e. a privacy manifold metric.

The privacy manifold metric is a special form of metric that the PS is preferably configured to generate. The privacy manifold metric is preferably a compound or manifold of metrics generated as a result of all the of the functional service elements that are active in a particular instant. Such a metric preferably provides an instantaneous and historical measure of real privacy to the End User.

Figure 18:
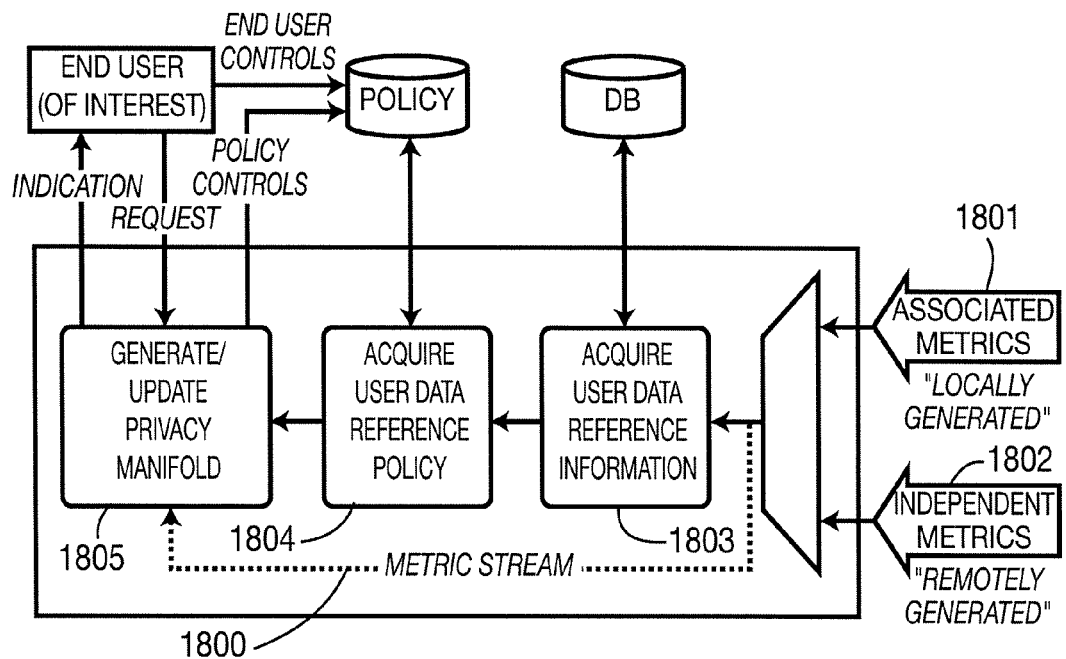
FIG. 18 is an exemplary diagram of a privacy manifold and its method of generation.

FIG. 18 shows an exemplary diagram of a privacy manifold metric and its method of generation. In normal operation, the PS preferably consumes a stream of metrics 1800 pertaining to both local 1801 and remote 1802 communication schema with respect to all User Data originated by an End User being served by the PS. The PS is preferably configured, upon receipt of each of these metrics, to identify the User Data or type of User Data 1803 to which the metric pertains. It is further preferably configured to then extract the policy associated with the respective User Data 1804. The policy provides information pertaining to the further processing, e.g. weighting, of the metric. This information along with the metric is preferably passed to the privacy manifold generation and update function 1805 as shown.

The privacy manifold metric is realized as a compound of the metrics received and is continuously updated throughout the lifetime of the PS operation. The PS is preferably configured to permit the End User to request the privacy manifold metric information as whole. In this case, the privacy manifold metric describes the real privacy pertaining to all of the End User's User Data and all communication schema logged in the system with respect thereto. Additionally, the PS is preferably configured to permit the End User to request refinements of the privacy manifold metric such as that associated with a single element or specific group of User Data. Additionally, the PS is preferably configured to permit the End User to request a more detailed review of the privacy manifold metric such as that describing the trustworthiness of a particular group of communication schema pertaining to a particular group of User Data.

Figure 19:
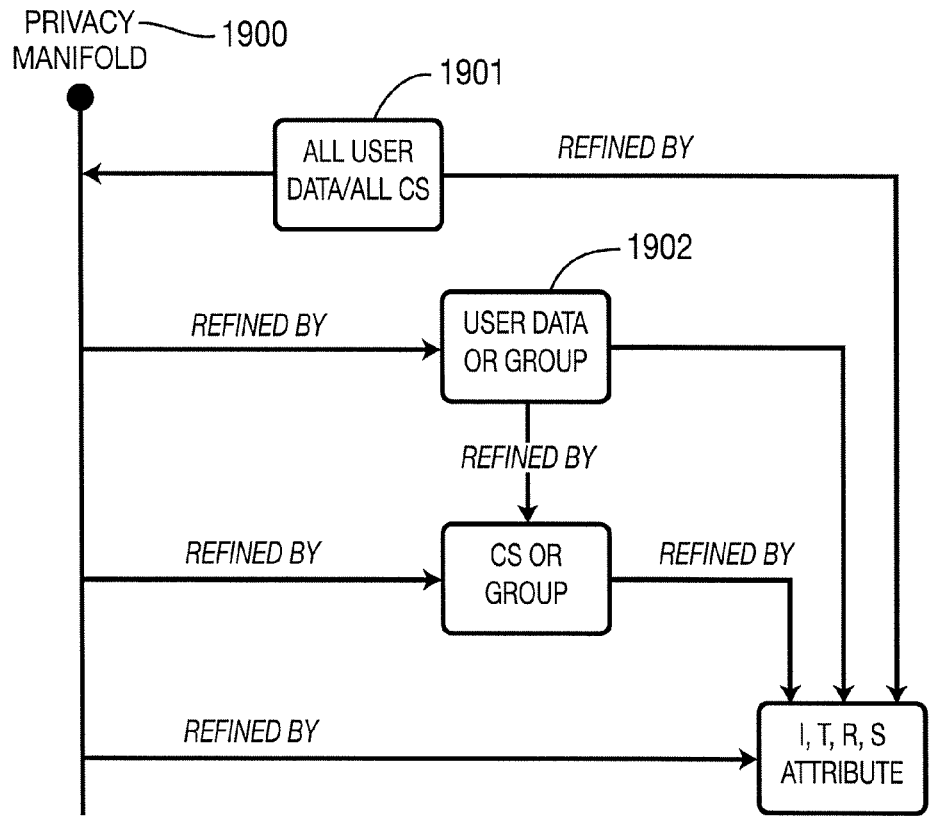
FIG. 19 is an exemplary diagram of a privacy manifold refinement hierarchy.

FIG. 19 illustrates a privacy manifold 1900 refinement hierarchy implemented in a preferred PS configuration. Specifically, FIG. 19 shows different levels of abstraction that may be applied by the PS in the generation of a privacy manifold metric 1900. For example, a user may want to generate a manifold metric in reference to only a single type of User Data 1902, e.g. a manifold metric describing how private the End User's medical records have been during a defined duration. Alternatively, a user may request a manifold metric be generated pertaining to the privacy of all User Data pertaining to all, or a subset, of the End User's User Data related communication schemas 1901. In each situation, the manifold can also be refined further by focusing in on one or more service element attributes, such as identity or trust violations.

Privacy manifold metric information can be used to an update to the End User's policy definition by the End User or an invocation of specific associated service or independent service action. Alternatively, the PS may be configured to automatically trigger such updates to the policy definition that in turn may lead to specific associated services or independent service actions.

To the extent that an End User's policy, privacy manifold metrics and/or other metrics are made available to another End User, such data may be used by the other End User's PS to establish or modify its own policies or for other applications.

By way of example, the present invention may be implemented in any of the following ways. An application programming interface (API), or a knowledge based system (KBS), could be configured between a PS virtual machine and any manifestation of a communications function in a Node. An API is configured between a PS entity (e.g., a virtual machine) and any manifestation of a database or KBS functionality in a Node. A service interface is realized via some means allowing the end user access to the PS virtual machine and functionality. The present invention may include an extension of a trusted computing group (TPG) trusted platform module architecture to include a PS virtual machine or any implementation of trusted computing functionality wherein such a virtual machine is embedded. An extension of a JAVA sandbox may be configured to include such a virtual machine. A visual or audible representation of the PS level on a Node may be implemented. An interface may be applied between the PS virtual machine and the operating system implemented (e.g. OS Traps etc) in support of the PS functionality.

Another implementation of the present invention includes an organization of a combination or gestalt of service elements into a downloadable/verifiable PS virtual machine. Alternatively, a system may provide a dynamic privacy policy capability where the dynamics are provided either with or without end user intervention. A PS with dynamic policy can be provided as an application rather than as a fixed setting. A system may be implemented such that an indication to the end user prompts the end user to interact with the PS functionality. A system may be implemented that utilizes the battery life/status of the physical device as input to decision regarding the instantaneous privacy policy to be applied.

The End User node as described above may be implemented as a wireless transmit/receive unit (WTRU), which includes but is not limited to a user equipment, mobile station, mesh node, fixed or mobile subscriber unit, access point, pager, or any other type of device capable of operating in a wireless environment.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method of controlling the use and communication of User Data in a network, the method comprising:
   maintaining in connection with a Privacy Service (PS), a policy for User Data related to one or more of an End User identity element, a User Data trust element, a User Data usage rights element or a User Data security element for use or communication of the User Data;
   in connection with a communication of the User Data from a sending node to a receiving node, receiving information by the PS related to attributes of the communication related to at least one of the Application, Context or Time of the communication;

updating the policy for the User Data based on the received information;

controlling the communication and use of the User data based on the updated policy for the User Data, wherein the controlling includes the sending of control information by the PS via a wireless interface;

using a processor for measuring and tracking PS metrics related to the End User identity element and for determining a selected policy manifold metric based on selected PS metrics accumulated or a selected time period whereby the policy manifold metric provides an overall privacy indication with respect to the User Data and selected time period upon which the selected PS metrics are based;

measuring by the PS metrics related to the End User identity element, the User Data trust element, the User Data usage rights element and the User Data security element for use or communication of the User Data in connection with the communication of the User Data and using the measurement in connection with maintaining the policy and controlling the User Data; and using the PS metrics to provide policy deviation indications to an End User, wherein the controlling the communication and use of the User data based on the updated policy for the User Data includes the sending of control information by the PS including policy control information originating from the End User based on the policy deviation indications.

2. The method of claim 1 wherein the controlling the communication and use of the User Data based on the updated policy for the User Data includes the sending of control information by the PS.

3. The method of claim 1 wherein the controlling the communication and use of the User Data based on the updated policy for the User Data includes controlling the exposure of an End User's identity identified with the User Data.

4. The method of claim 1 wherein the controlling the communication and use of the User Data based on the updated policy for the User Data includes providing an indication of the trustworthiness of the User Data in connection with the communication of the user Data.

5. The method of claim 1 wherein the controlling the communication and use of the User Data based on the updated policy for the User Data defining a set of rights for usage of the User Data by the receiving node following the communication of the User Data.

6. The method of claim 1 wherein the controlling the communication and use of the User Data based on the updated policy for the User Data includes controlling the security of the transmission and access to the User Data in connection with the communication of user data.

7. The method of claim 6 wherein the controlling of security includes at least one of controlling a communication encryption level, User Data password protection, and a site key.

8. The method of claim 1 wherein the receiving information by the PS related to attributes of the communication includes receiving information related to the Application, Context and Time of the communication.

9. The method of claim 1 wherein the controlling the communication and use of the User Data based on the updated policy for the User Data includes the sending of control information by the PS.

10. The method of claim 1 wherein the controlling the communication and use of the User Data based on the updated policy for the User Data includes controlling the exposure of an End User's identity identified with the User Data.

11. The method of claim 1 wherein the controlling the communication and use of the User Data based on the updated policy for the User Data includes providing an indication of the trustworthiness of the User Data in connection with the communication of the user Data.

12. The method of claim 1 wherein the controlling the communication and use of the User Data based on the updated policy for the User Data defining a set of rights for usage of the User Data by the receiving node following the communication of the User Data.

13. The method of claim 1 wherein the controlling the communication and use of the User Data based on the updated policy for the User Data includes controlling the security of the transmission and access to the User Data in connection with the communication of user data.

14. The method of claim 13 wherein the controlling of security includes at least one of controlling a communication encryption level, User Data password protection, and a site key.

15. The method of claim 1 where the PS is implemented in a wireless communication device for a user of the communication device as a network.

16. The method of claim 1 where the PS is implemented in a network component that is separate from a communication device used by an End User of the PS, further comprising communicating with the communication device by the End User to establish or modify the policy for the User Data.

17. A privacy server configured to control the use and communication of User Data in a network comprising:

a processor; and a computer-readable storage medium configured for execution of components by the processor, the components including:

a component configured to maintain a policy for User Data related to one or more of an End User identity element, a User Data trust element, User Data usage rights element and User Data security element for use or communication of the User Data;

a component configured to receive information related to attributes of to a communication of the User Data from a sending node to a receiving, the attributes related to at least one of the Application, Context or Time of the communication;

a component configured to update the policy for the User Data based on the received information; and a component configured to send control information via a wireless interface to control the communication and use of the User Data based on the updated policy for the User Data; and a component configured to measure and track privacy service (PS) metrics and to determine a selected policy manifold metric based on selected PS metrics accumulated or a selected time period whereby determined policy manifold metrics provide an overall privacy indication with respect to the User Data and selected time period upon which the selected PS metrics are based;

a component configured to measure metrics related to the End User identity element, the User Data trust element, the User Data usage rights element and the User Data security element for use or communication of the User Data in connection with the communication of the User Data, wherein the measurement is used to maintain the policy and to control the communication and the use of the User Data; and a component configured to use the PS metrics to provide policy deviation indications to an End User, wherein the control information includes policy control information originating from the End User based on the policy deviation indications.

18. The privacy server claim 17 wherein PS components are implemented in a single device for configured to serve a single policy setting End User.

19. he privacy server of claim 17 wherein component configured to send information to control the communication and use of the User Data is configured to send information to control the exposure of an End User's identity identified with the User Data.

20. The privacy server of claim 17 wherein component configured to send information to control the communication and use of the User Data is configured to send information providing an indication of the trustworthiness of the User Data in connection with the communication of the user Data.

21. The privacy server of claim 17 wherein component configured to send information to control the communication and use of the User Data is configured to send information to define a set of rights for usage of the User Data by the receiving node following the communication of the User Data.

22. The privacy server of claim 17 wherein component configured to send information to control the communication and use of the
User Data is configured to send information to control the security of the transmission and access to the User Data in connection with the communication of user data.

23. The privacy server of claim 22 wherein component configured to send information to control the communication and use of the User Data is configured to send information to control at least one of a communication encryption level, User Data password protection, and a site key.

24. The privacy server of claim 17 wherein the component configured to maintain the policy for User Data is configured to maintain a policy related to an End User identity element, a User Data trust element, a User Data usage rights element and a User Data security element for use or communication of the User Data.

25. The privacy server of claim 24 wherein component configured to receive information related to attributes of the communication is configured to receive information related to the Application, Context and Time of the communication.

26. The privacy server of claim 24 wherein the PS components are implemented in a single device for configured to serve a single policy setting End User.

27. The privacy server of claim 24 wherein component configured to send information to control the communication and use of the User Data is configured to send information to control the exposure of an End User's identity identified with the User Data.

28. The privacy server of claim 24 wherein component configured to send information to control the communication and use of the User Data is configured to send information providing an indication of the trustworthiness of the User Data in connection with the communication of the user Data.

29. The privacy server of claim 24 wherein component configured to send information to control the communication and use of the User Data is configured to send information to define a set of rights for usage of the User Data by the receiving node following the communication of the User Data.

30. The privacy server of claim 24 wherein component configured to send information to control the communication and use of the User Data is configured to send information to control the security of the transmission and access to the User Data in connection with the communication of user data.

31. The privacy server of claim 30 wherein component configured to send information to control the communication and use of the User Data is configured to send information to control at least one of a communication encryption level, User Data password protection, and a site key.

32. The privacy server of claim 17 implemented in a communication device configured for use as a network node by a user of the PS.

33. The privacy server of claim 17 implemented in a wireless transmit receive unit (WTRU) configured for use as a network node by a user of the PS wherein the WTRU is configured to send the control information via a wireless interface.

34. The privacy server of claim 17 where the PS is implemented in a network component that is separate from a communication device used by an End User of the PS, further comprising a component for communicating with the communication device used by the End User to establish or modify the policy for the User Data.

\* \* \* \* \*

UNITED STATES PATENT AND TRADEMARK OFFICE
CERTIFICATE OF CORRECTION

| | |
|---|---|
| PATENT NO. | : 7,877,494 B2 |
| APPLICATION NO. | : 11/749769 |
| DATED | : January 11, 2011 |
| INVENTOR(S) | : Carlton et al. |

It is certified that error appears in the above-identified patent and that said Letters Patent is hereby corrected as shown below:

At Claim 5, column 23, line 44, after "User Data", delete "defining" and insert --defines--.

At Claim 14, column 24, line 16, after "the controlling", delete "of" and insert --the--.

At Claim 15, column 24, line 20, after "method of claim 1", delete "where" and insert --wherein--.

At Claim 16, column 24, line 23, after "method of claim 1", delete "where" and insert --wherein--.

At Claim 17, column 24, line 41, after "attributes of", delete "to".

At Claim 17, column 24, line 42, after "a receiving", insert --node--.

At Claim 18, column 25, line 4, after "privacy server" insert --of--.

At Claim 18, column 25, line 5, after "single device", delete "for".

At Claim 19, column 25, line 7, before "privacy" delete "he" and insert --The--.

At Claim 19, column 25, line 7, after "claim 17 wherein" insert --the--.

At Claim 20, column 25, line 12, after "claim 17 wherein" insert --the--.

At Claim 21, column 25, line 18, after "claim 17 wherein" insert --the--.

At Claim 22, column 25, line 23, after "claim 17 wherein" insert --the--.

At Claim 23, column 25, line 29, after "claim 22 wherein" insert --the--.

At Claim 25, column 25, line 40, after "claim 24 wherein" insert --the--.

At Claim 26, column 26, line 2, after "single device", delete "for".

At Claim 27, column 26, line 4, after "claim 24 wherein" insert --the--.

Signed and Sealed this
Twenty-fourth Day of January, 2012

David J. Kappos
*Director of the United States Patent and Trademark Office*

CERTIFICATE OF CORRECTION (continued)
U.S. Pat. No. 7,877,494 B2

At Claim 28, column 26, line 9, after "claim 24 wherein" insert --the--.

At Claim 29, column 26, line 14, after "claim 24 wherein" insert --the--.

At Claim 30, column 26, line 19, after "claim 24 wherein" insert --the--.

At Claim 31, column 26, line 24, after "claim 30 wherein" insert --the--.

At Claim 34, column 26, line 37, after "server of claim 17", delete "where" and insert --wherein--.